(12) United States Patent
Yamashita

(10) Patent No.: US 8,751,108 B2
(45) Date of Patent: Jun. 10, 2014

(54) STEERING DEVICE FOR VEHICLE

(75) Inventor: Masaharu Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 736 days.

(21) Appl. No.: 12/990,850

(22) PCT Filed: Apr. 3, 2009

(86) PCT No.: PCT/IB2009/005174
§ 371 (c)(1),
(2), (4) Date: Nov. 3, 2010

(87) PCT Pub. No.: WO2009/138830
PCT Pub. Date: Nov. 19, 2009

(65) Prior Publication Data
US 2011/0054742 A1    Mar. 3, 2011

(30) Foreign Application Priority Data
May 14, 2008   (JP) .................................. 2008-126735

(51) Int. Cl.
*B62D 6/00*        (2006.01)
(52) U.S. Cl.
USPC ............................... 701/41; 701/43; 180/446
(58) Field of Classification Search
CPC ...... B62D 5/0481; B62D 5/0463; B62D 5/04; B62D 6/00
USPC ....................................... 701/41, 43; 180/446
See application file for complete search history.

(56) References Cited

U.S. PATENT DOCUMENTS

| | | | | |
|---|---|---|---|---|
| 5,758,741 | A | * | 6/1998 | Tomioka ....................... 180/446 |
| 8,473,161 | B2 | * | 6/2013 | Izutani et al. .................... 701/43 |

(Continued)

FOREIGN PATENT DOCUMENTS

| | | |
|---|---|---|
| DE | 199 06 402 | 8/2000 |
| EP | 1 810 909 | 7/2007 |

(Continued)

OTHER PUBLICATIONS

Office Action issued Apr. 23, 2010, in Japanese Patent Application No. 2008-126735 filed May 14, 2008 (with English-language translation).

(Continued)

*Primary Examiner* — Khoi Tran
*Assistant Examiner* — Ryan Rink
(74) *Attorney, Agent, or Firm* — Oblon, Spivak, McClelland, Maier & Neustadt, L.L.P.

(57) ABSTRACT

If the main electric power source has failed, an assist control portion shifts the characteristic of an assist map in which the steering torque and the target current are connected in a relation by one step of shift in a direction of increase of the steering torque each time a steering operation that satisfies a steering operation criterion condition is performed. This allows a driver to feel a decline in the steering assist force each time of performing steering operation and therefore become aware of the abnormality. Besides, an upper-limit current of the assist map may be reduced each time the steering operation that satisfies the steering operation criterion condition is performed. Besides, an upper-limit electric power of an electric motor may be reduced each time the steering operation that satisfies the steering operation criterion condition is performed.

19 Claims, 15 Drawing Sheets

(56) References Cited

U.S. PATENT DOCUMENTS

| | | | |
|---|---|---|---|
| 2007/0169987 A1 | 7/2007 | Fujiyama | |
| 2008/0004773 A1* | 1/2008 | Maeda | 701/41 |
| 2008/0018280 A1 | 1/2008 | Maeda | |
| 2008/0033613 A1* | 2/2008 | Tamaizumi et al. | 701/41 |
| 2008/0035411 A1* | 2/2008 | Yamashita et al. | 180/443 |
| 2008/0234897 A1* | 9/2008 | Tsuchida | 701/42 |
| 2008/0294313 A1* | 11/2008 | Aoki et al. | 701/43 |
| 2009/0084616 A1* | 4/2009 | Kezobo et al. | 180/6.44 |
| 2011/0066331 A1* | 3/2011 | Yamashita | 701/42 |

FOREIGN PATENT DOCUMENTS

| | | |
|---|---|---|
| EP | 1 878 637 | 1/2008 |
| JP | 08 216910 | 8/1996 |
| JP | 10 226349 | 8/1998 |
| JP | 2001 10514 | 1/2001 |
| JP | 2001 258168 | 9/2001 |
| JP | 2002 19635 | 1/2002 |
| JP | 2003 312510 | 11/2003 |
| JP | 2007 22194 | 2/2007 |
| JP | 2007 83947 | 4/2007 |
| JP | 2007 210365 | 8/2007 |
| JP | 2007210365 A * | 8/2007 |
| WO | 2007 034996 | 3/2007 |

OTHER PUBLICATIONS

International Search Report issued Jul. 24, 2009 in PCT/IB09/005174 filed Apr. 3, 2009.

* cited by examiner

STEERING DEVICE FOR VEHICLE

BACKGROUND OF THE INVENTION

1. Field of the Invention

The invention relates to a steering device that is equipped with an electric motor so as to provide steering assist force for the pivoting operation of a steering handle and a control method for the steering device.

2. Description of the Related Art

An electric power steering device according to the related art is equipped with an electric motor so as to provide steering assist force for the pivoting operation of a steering handle, and adjusts the steering assist force by controlling the electrification of the electric motor. Such an electric power steering device is supplied with source power from a vehicle-mounted electric power source device. However, in the case where an abnormality occurs in the vehicle-mounted electric power source device, the electric power steering device cannot appropriately perform the control of the electric motor. Therefore, for example, an electric power steering device proposed in Japanese Patent Application Publication No. 2003-312510 (JP-A-2003-312510) adopts a construction in which when the power source voltage of the vehicle-mounted electric power supply device declines and reaches a predetermined value which is set as an abnormal value, the motor control output gain gradually decreases from 1 to zero, and an assist command value is multiplied by the reduced gain.

However, the electric power steering device proposed in Japanese Patent Application Publication No. 2003-312510 (JP-A-2003-312510) is constructed so as to gradually decrease the gain by which the assist command value is multiplied, irrespective of operation performed by a driver of the vehicle. Therefore, the gain declines even when the driver is not performing a steering operation. Therefore, there occurs a case where when the driver actually performs steering operation, the gain has considerably decreased as compared with the gain obtained at the time of the immediately previous steering operation. In such a case, the steering feel suddenly changes, causing considerable discomfort to the driver.

SUMMARY OF THE INVENTION

The invention certainly informs a driver that the steering assist force has been reduced, and thus notifies the driver of abnormality, without causing discomfort to the driver.

A first aspect of the invention relates to a vehicle steering device that includes: a steering mechanism that steers a wheel of a vehicle upon steering operation of a steering handle; an electric motor that is supplied with source power from an electric power source device and that generates assist force that assists in the steering operation of the steering handle; steering torque detection means for detecting steering torque that a driver of the vehicle inputs to the steering handle; control value computation means for storing an assist characteristic that sets a motor control value that corresponds to at least the steering torque, and for computing the motor control value based on the assist characteristic; and motor control means for controlling driving of the electric motor so that if the motor control value is larger, a larger assist force is generated, based on the motor control value computed by the control value computation means. This vehicle steering device includes: electric power source abnormality detection means for detecting abnormality of sauce power supply capability of the electric power source device; abnormality-time steering operation determination means for determining whether or not a steering operation that satisfies a pre-set steering operation criterion condition has been performed if the abnormality of the source power supply capability of the electric power source device has been detected by the electric power source abnormality detection means; and control value reduction means for reducing the motor control value that corresponds to the steering torque, if it is determined by the abnormality-time steering operation determination means that the steering operation that satisfies the steering operation criterion condition has been performed.

The abnormality-time steering operation determination means may determine that the steering operation that satisfies the steering operation criterion condition has been performed, if the steering torque detected by the steering torque detection means is greater than a pre-set reference value.

Besides, the abnormality-time steering operation determination means may repeatedly determine whether or not the steering operation that satisfies the steering operation criterion condition has been performed, and each time it is determined that the steering operation that satisfies the steering operation criterion condition is performed, the control value reduction means may reduce the motor control value that corresponds to the steering torque.

In this aspect of the invention, the steering torque detection means detects the steering torque that is input to the steering handle, and the control value computation means computes a motor control value that corresponds to the steering torque detected by the steering torque detection means on the basis of the assist characteristic. The assist characteristic, for example, may set a relation between the steering torque and the motor control value so that the assist force has a characteristic of increasing with increases in the steering torque, and can be stored as a reference map or a function. This motor control value is set corresponding to at least the steering torque, and may be computed, for example, by factoring in other factors such as the vehicle speed, the steering speed, the steering angle, etc. The motor control means assists in the driver's steering operation by controlling the driving of the electric motor so that the larger the motor control value is, the larger assist force is generated, on the basis of the computed motor control value. The electric motor is supplied with source electric power from the electric power source device. The electric power source abnormality detection means detects abnormality of the source power supply capability of the electric power source device. If the abnormality of the source power supply capability of the electric power source device is detected, the abnormality-time steering operation determination means determines whether or not a steering operation that satisfies a pre-set steering operation criterion condition has been performed. For example, in the case where the steering torque input to the steering handle exceeds a pre-set reference value, it is determined that a steering operation that satisfies the steering operation criterion condition has been performed.

Each time it is determined by the abnormality-time steering operation determination means that a steering operation that satisfies the steering operation criterion condition has been performed, the control value reduction means reduces the motor control value that corresponds to the steering torque. For example, each time it is determined that the foregoing steering operation has been performed, the control value reduction means changes the assist characteristic so as to reduce the motor control value that corresponds to the steering torque, or so as to reduce the motor control value that is obtained from the assist characteristic. Therefore, the assist force generated by the electric motor declines only when the driver actually performs a steering operation. That is, the assist force can be reduced in agreement with the driver's steering operation. Therefore, there is no occurrence of an undesired event in which while the driver is not performing a steering operation, the assist characteristic sharply changes, and thus causes discomfort to the driver. Besides, decline of the assist force can be certainly caused to be felt by the driver, whereby the abnormality can be made known to the driver.

Incidentally, the motor control value means an electric current value or a voltage value for controlling the driving of the electric motor, and does not mean only the value of current that is finally passed through the electric motor or the value of voltage that is finally applied to the electric motor, but may also be an electric current value or a voltage value that serves as a basis for bringing about the final current value or the final voltage value. Besides, when the motor control value that corresponds to the steering torque is to be reduced, it is not altogether necessary to reduce the motor control value over the entire range of the steering torque, but it suffices to reduce the motor control value that corresponds to the steering torque at least in a partial region of the steering torque (a partial range of the steering torque).

In the foregoing construction of the invention, the motor control value may be a target current value of the electric motor, and the assist characteristic may set a relation between the steering torque and the target current value such that the target current value has a characteristic of increasing with an increase in the steering torque. Besides, the control value reduction means may reduce the motor control value that corresponds to the steering torque by shifting value of the steering torque relative to the target current value in the assist characteristic to a side of increase.

In this construction, the control value computation means computes a target current value on the basis of the assist characteristic that sets a relation between the steering torque and the target current value. This assist characteristic sets a relation between the steering torque and the target current value so that the target current value has a characteristic of increasing with increases in the steering torque, and can be stored, for example, as a reference map or a function. The motor control means controls the driving of the electric motor on the basis of the computed target current value. In the case where abnormality of the source power supply capability of the electric power source device is detected, each time the driver performs a steering operation that satisfies the steering operation criterion condition (e.g., inputs to the steering handle a steering torque that is greater than a reference value), the control value reduction means changes the correspondence relation between the steering torque and the target current value in the assist characteristic so as to shift the value of steering torque relative to the target current value to the side of increase. Therefore, during the time of the abnormality, the target current value set corresponding to the steering torque that the driver inputs to the steering handle becomes smaller than when the electric power source is normal. To put it in the other way around, the steering torque that the driver inputs in order to obtain an assist force becomes larger. Therefore, the steering handle operation becomes heavier. Hence, the driver appropriately feels a decline in the assist force each time of performing steering handle operation, and therefore can become aware of the abnormality.

The control value reduction means may shift the value of the steering torque relative to the target current value in the assist characteristic, by one step at a time to the side of increase.

In this construction, each time the driver performs a steering operation that satisfies the steering operation criterion condition, the value of the steering torque relative to the target current value in the assist characteristic is shifted by one step to the side of increase. For example, each time the driver performs one complete steering operation that involves detection of a steering torque that is greater than the reference value, the value of the steering torque relative to the target current value is shifted by one step to the side of increase. Therefore, the driver appropriately feels a decline of the assist force each time of performing steering handle operation, and thus can become aware of abnormality.

An amount of shift by which the value of the steering torque relative to the target current value in the assist characteristic is shifted by one step to the side of increase may be a pre-set set amount, and may be a value that allows the driver to feel a decrease in the assist force.

According to this construction, when the value of the steering torque relative to the target current value in the assist characteristic is shifted by one step, the driver can certainly be caused to feel that the assist force has decreased.

The vehicle steering device may further include a steering operation end determination means for determining whether or not one performance of steering operation has ended, and each time it is determined that the steering operation that satisfies the steering operation criterion condition has been performed, the control value reduction means gradually may increase the value of the steering torque relative to the target current value in the assist characteristic during a time from determination that the steering operation has been performed until it is determined that the steering operation has ended.

In this construction, while the driver is performing steering operation, for example, while the driver is inputting to the steering handle the steering torque that is greater than the reference value, the value of the steering torque relative to the target current value in the assist characteristic increases. Therefore, the driver feels that the assist force gradually declines while operating the steering handle, and therefore can become aware of the abnormality.

The motor control value may be a target current value of the electric motor, and the assist characteristic may set a relation between the steering torque and the target current value such that the target current value increases with an increase in the steering torque, and such that the target current value is restricted to be less than or equal to an upper-limit current value. Besides, the control value reduction means may reduce the motor control value that corresponds to the steering torque by reducing the upper-limit current value. In this case, the control value reduction means may reduce the upper-limit current value one step at a time.

In this construction, the control value computation means computes a target current value on the basis of the assist characteristic that sets a relation between the steering torque and the target current value. This assist characteristic sets a relation between the steering torque and the target current value such that the target current value increases with increases in the steering torque, and such that the target current value is restricted to be less than or equal to the upper-limit current value, and can be stored, for example, as a reference map or a function. The motor control means controls the driving of the electric motor on the basis of the computed target current value. In the case where the abnormality of the source power supply capability of the electric power source device is detected, the control value reduction means reduces the upper-limit current value of the target current value each time a steering operation that satisfies the steering operation criterion condition is performed. Generally, in the case where the driving of the electric motor is controlled, an upper-limit current value that is an upper-limit value of the electric current to be passed through the electric motor is set in order to protect the electric motor or the motor drive circuit. Therefore, in the case where the target current value has reached the upper-limit current value, the control value computation means, when calculating the motor control value, restricts the target current value from exceeding the upper-limit current value even if the steering torque increases.

In the case where the driver strongly performs a steering operation, the target current value is restricted to become equal to the upper-limit current value. If in that case, the abnormality of the source power supply capability of the electric power source device has been detected, the upper-limit current value is reduced each time the steering operation is performed. Therefore, the target current value set corresponding to the steering torque in a high torque region is reduced. Thus, in agreement with the driver's steering operation, restriction with the upper-limit current value of the electric motor is gradually applied, so that the assist force declines. Hence, the driver appropriately feels a decline of the assist force each time of performing the steering handle operation, and therefore can become aware of the abnormality.

The vehicle steering device may further include steering operation end determination means for determining whether or not one performance of steering operation has ended, and each time it is determined that the steering operation that satisfies the steering operation criterion condition has been performed, the control value reduction means may gradually decrease the upper-limit current value during a time from determination that the steering operation has been performed until it is determined that the steering operation has ended.

In this construction, while the driver is performing the steering operation, that is, while the driver is inputting to the steering handle the steering torque that is greater than the reference value, the upper-limit current value decreases. Therefore, the driver feels that the assist force gradually declines while operating the steering handle, and therefore can become aware of the abnormality.

The control value reduction means may reduce the motor control value that corresponds to the steering torque by reducing an upper-limit electric power value that sets an upper limit of electric power consumption of the electric motor. In this case, the control value reduction means may reduce the upper-limit electric power value by one step at a time.

In this construction, in the case where the abnormality of the source power supply capability of the electric power source device is detected, the control value reduction means reduces the upper-limit electric power value that sets an upper limit of the electric power consumption of the electric motor, each time a steering operation that satisfies the steering operation criterion condition is performed. The control current computation means, when computing the motor control value, computes it so that the electric power consumption of the electric motor does not exceed the upper-limit electric power value. The output of the electric motor is proportional to a product of the steering assist torque and the steering speed. Besides, the output of the electric motor is restricted by restricting the electric power consumption thereof. Therefore, as the electric power consumption of the electric motor is restricted, the motor control value that corresponds to the steering torque is reduced, and the tenacious feel perceived when the steering handle is quickly turned increases. Therefore, at the time of abnormality of electric power source device, the tenacity in the steering feel gradually increases in agreement with the driver's steering operation, so that the driver can become aware of the abnormality.

The vehicle steering device may further include steering operation end determination means for determining whether or not one performance of steering operation has ended, and each time it is determined that the steering operation that satisfies the steering operation criterion condition has been performed, the control value reduction means may gradually decrease the upper-limit electric power value during a time from determination that the steering operation has been performed until it is determined that the steering operation has ended.

In this construction, while the driver is performing steering operation, for example, while the driver is inputting to the steering handle the steering torque that is greater than the reference value, the upper-limit electric power value decreases. Therefore, the driver feels that the tenacious feel during steering handle operation gradually increases, and therefore can become aware of the abnormality.

The vehicle steering device may further include: steering speed detection means for detecting steering speed; and reduction amount restriction means for decreasing a reduction amount by which the control value reduction means reduces the motor control value if the steering speed detected by the steering speed detection means is greater than a pre-set reference steering speed.

In the foregoing construction, when the source power supply capability of the electric power source device is abnormal, the assist force is controlled so as to decrease in agreement with the steering handle operation. In this construction, when the driver is in a situation of particularly needing the steering assist, the reduction of the assist force is restrained, and the steering assist for the driver is given priority. That is, in the case where the steering speed is greater than a pre-set reference steering speed, it is estimated that the driver is in a situation of particularly needing the steering assist, and the reduction amount restriction means reduces the reduction amount by which the control value reduction means reduces the motor control value. Therefore, in the case where the driver is in a situation of particularly needing the steering assist, appropriate steering assist can be obtained. Thus, this construction is effective and improves safety, for example, in the case where an emergency steering operation for avoidance of the contact with another vehicle, or the like, becomes needed. Incidentally, decreasing the reduction amount includes making the reduction amount zero, that is, not reducing the motor control value.

The vehicle steering device may further include reduction amount restriction means for decreasing a reduction amount by which the control value reduction means reduces the motor control value if the steering torque detected by the steering torque detection means is greater than a pre-set reduction amount restriction criterion torque.

In this construction, too, when the driver is in a situation of particularly needing steering assist, the foregoing reduction of the assist force is restrained, and the steering assist for the driver is given priority. In the case where the steering torque detected by the steering torque detection means is greater than the pre-set reduction amount restriction criterion torque, it is estimated that the driver is in a situation of particularly needing steering assist, and the reduction amount restriction means decreases the reduction amount by which the control value reduction means reduces the motor control value. For example, in the case where the determination regarding the steering operation of the driver is performed by using the steering torque, the reduction amount restriction criterion torque is set at a value of torque that is larger than a reference value used for the determination regarding the steering operation. Therefore, in the case where the driver is in a situation of particularly needing steering assist, appropriate steering assist can be obtained, and the foregoing construction is effective and improves safety, for example, in the case where an emergency steering operation for avoidance of the contact with another vehicle, or the like, becomes needed. Incidentally, decreasing the reduction amount includes making the reduction amount zero, that is, not reducing the motor control value.

The electric power source device may have a main electric power source that supplies source power to a plurality of electrical loads in the vehicle that include the electric motor, and a subsidiary electric power source which is connected in parallel between the main electric power source and the electric motor, and which stores electric power that the main electric power source outputs, and which assists in supply of source power to the electric motor by using the electric power stored, and the electric power source abnormality detection means may detect a state in which source power is unable to be supplied from the main electric power source to the electric motor.

In this construction, the main electric power source and the subsidiary electric power source are provided as electric power sources that supply source power to the electric motor, and source power can be supplied from the subsidiary electric power source to the electric motor even in the case where the capability of the main electric power source for supplying source power to the electric motor is lost due to a line break or the like. However, if the assist control (control of the electric motor) is continued by using the subsidiary electric power source without changing the assist controlled, it becomes hard to cause the driver to become aware of the abnormality of the main electric power source. In this case, the steering assist suddenly becomes null when there comes a situation in which the source power supply capability of the subsidiary electric power source is lost. In that case, there is possibility of causing great discomfort to the driver.

Therefore, the electric power source abnormality detection means detects a state in which the supply of source power from the main electric power source to the electric motor is impossible. Therefore, from the time point at which abnormality of the source power supply capability of the main electric power source is detected while the subsidiary electric power source is normal, the control is switched to a control in which the assist force is reduced in agreement with the steering operation. Hence, the driver can be caused to become aware of the abnormality in an early period. As a result, repair of failure can be favorably coped with.

A second aspect of the invention relates to a control method for a vehicle steering device that includes: a steering mechanism that steers a wheel of a vehicle upon steering operation of a steering handle; an electric motor that is supplied with source power from an electric power source device and that generates assist force that assists in the steering operation of the steering handle; steering torque detection means for detecting steering torque that a driver of the vehicle inputs to the steering handle; control value computation means for storing an assist characteristic that sets a motor control value that corresponds to the steering torque, and for computing the motor control value based on the assist characteristic; and motor control means for controlling driving of the electric motor so that if the motor control value is larger, a larger assist force is generated, based on the motor control value computed by the control value computation means. The steering device control method includes: the step of detecting abnormality of sauce power supply capability of the electric power source device; the step of determining whether or not a steering operation that satisfies a pre-set steering operation criterion condition has been performed if the abnormality of the source power supply capability has been detected; and the step of reducing the motor control value that corresponds to the steering torque, if it is determined that the steering operation that satisfies the steering operation criterion condition has been performed.

Besides, in the vehicle steering device control method, it may be repeatedly determined whether or not the steering operation that satisfies the steering operation criterion condition has been performed, and the motor control value that corresponds to the steering torque may be reduced each time it is determined that the steering operation that satisfies the steering operation criterion condition is performed.

Furthermore, degree of reduction of the motor control value by the control value reduction means may be increased with an increase in number of times of it being determined that the steering operation that satisfies the steering operation criterion condition has been performed.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Figure 1:
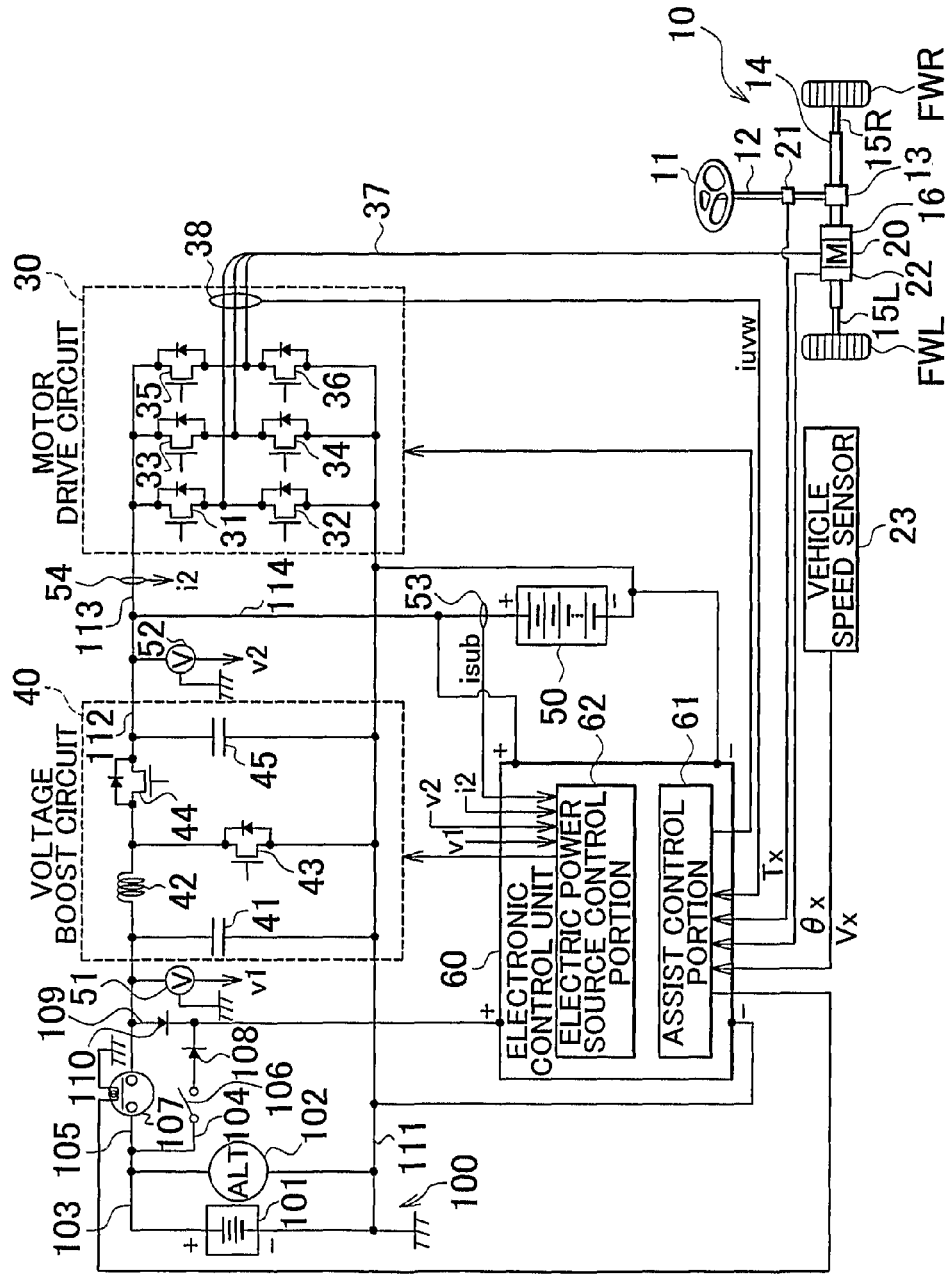
FIG. 1 is a general system construction diagram of an electric power steering device in accordance with a first embodiment of the invention.

A steering device for a vehicle in accordance with a first embodiment of the invention will be described hereinafter with reference to the drawings. FIG. 1 represents a general construction of an electric power steering device for a vehicle as the first embodiment.

This electric power steering device includes, as main portions, a steering mechanism 10 that steers steering road wheels according to the steering operation of a steering handle 11, an electric motor 20 assembled to the steering mechanism 10 to generate steering assist torque, a motor drive circuit 30 that drives the electric motor 20, a voltage boost circuit 40 that boosts the output voltage of a main electric power source 100 and thus supplies source power to the motor drive circuit 30, a subsidiary electric power source 50 connected in parallel with a power source supply circuit between the voltage boost circuit 40 and the motor drive circuit 30, and an electronic control unit 60 that controls the operation of the electric motor 20 and the voltage boost circuit 40. The electronic control unit 60 is an example of a control device in the invention. In this specification, while a plurality of embodiments will be described, the embodiments are different merely in the control process of the electronic control unit 60, and are the same in the hardware construction.

The steering mechanism 10 is a mechanism for steering left and right front wheels FWL, FWR by rotationally operating the steering handle 11, and includes a steering shaft 12 that is connected at an upper end thereof to the steering handle 11 so as to rotate integrally with the steering handle 11. A pinion 13 is connected to a lower end of the steering shaft 12 so as to rotate integrally with the steering shaft. The pinion 13 meshes with rack teeth formed on a rack bar 14, thus forming a rack-and-pinion mechanism together with the rack bar 14. Knuckles (not shown) of the left and right front wheels FWL, FWR are steerably connected to two ends of the rack bar 14 via tie rods 15L, 15R. The left and right front wheels FWL, FWR are steered to left and right according to the displacement of the rack bar 14 in the direction of its own axis associated with the rotation of the steering shaft 12 about its own axis.

The electric motor 20 for the steering assist is assembled to the rack bar 14. A rotation shaft of the electric motor 20 is connected to the rack bar 14 via a ball screw mechanism 16 so as to be capable of transmitting mechanical power. Rotation of the rotation shaft gives steering force to the left and right front wheels FWL, FWR, thus assisting a driver in the steering operation. The ball screw mechanism 16 functions as a speed reducer and a rotary-linear motion converter, that is, transmits the motion of the electric motor 20 to the rack bar 14 while reducing the speed of the rotation of the electric motor 20 and converting the rotation into linear motion.

The steering shaft 12 is provided with a steering torque sensor 21. The steering torque sensor 21 outputs a signal commensurate with the steering torque that acts on the steering shaft 12 due to the pivoting operation of the steering handle 11. The value of steering torque detected by the signal output by the steering torque sensor 21 will be hereinafter termed the steering torque Tx. By the positive and negative signs of the steering torque Tx, the operating direction of the steering handle 11 is discerned. In this embodiment, the steering torque Tx caused when the steering handle 11 is steered in the right-hand direction is shown as a positive value, and the steering torque Tx caused when the steering handle 11 is steered in the left-hand direction is shown as a negative value. Therefore, when the magnitude of the steering torque Tx is discussed below, the magnitude of the absolute value thereof will be used.

The electric motor 20 is provided with a rotation angle sensor 22. This rotation angle sensor 22 is incorporated in the electric motor 20, and outputs a detection signal commensurate with the rotational angular position of a rotor of the electric motor 20. The detection signal from the rotation angle sensor 22 is used to calculate the rotation angle and the rotation angular velocity of the electric motor 20. In addition, the rotation angle of the electric motor 20 is proportional to the steering angle of the steering handle 11, and is therefore used as the steering angle of the steering handle 11 as well. Besides, the rotation angular velocity, which is a time derivative of the rotation angle of the electric motor 20, is proportional to the steering angular velocity of the steering handle 11, and is therefore used as the steering speed of the steering handle 11 as well. Hereinafter, the value of the steering angle of the steering handle 11 detected from the output signal of the rotation angle sensor 22 will be termed the steering angle $\theta x$, and the value of the steering angular velocity obtained by differentiating the steering angle $\theta x$ with respect to time will be termed the steering speed $\omega x$. The positive sign and the negative sign of the value of the steering angle $\theta x$ represent the steering angles in the rightward direction and the leftward direction, respectively, from the neutral position of the steering handle 11. In this embodiment, the neutral position of the steering handle 11 is shown by "0", and the steering angle in the rightward direction from the neutral position is shown by a positive value, and the steering angle in the leftward direction from the neutral position is shown by a negative value.

The motor drive circuit 30 is a three-phase inverter circuit constructed of six switching elements 31 to 36 which are each made up of a MOSFET. Concretely, a circuit formed by connecting a first switching element 31 and a second switching element 32 in series, a circuit formed by connecting a third switching element 33 and a fourth switching element 34 in series, a circuit formed by connecting a fifth switching element 35 and a sixth switching element 36 in series are interconnected in parallel, and a power source supply line 37 is led out from a line between two switching elements (31-32, 33-34, 35-36) of each of the series circuits.

A current sensor 38 is provided on the power source supply lines 37 extending from the motor drive circuit 30 to the electric motor 20. This current sensor 38 detects (measures) the electric current that flows separately for each phase, and outputs a detection signal corresponding to the detected electric current value to the electronic control unit 60. Hereinafter, the measured electric current value will be termed the motor current iuvw. Besides, this current sensor 38 will be termed the motor current sensor 38.

As for each of the switching elements 31 to 36, the gate thereof is connected to an assist control portion 61 (described later) of the electronic control unit 60, and the duty ratio is controlled by a PWM control signal from the assist control portion 61. As a result, the drive voltage of the electric motor 20 is adjusted to a target voltage. Incidentally, as shown by a circuit symbol in the diagram, each of the MOSFETs constituting the switching elements 31 to 36 has a parasitic diode as a part of its structure.

Next, a power source supply system of the electric power steering device will be described. An electric power source device of the electric power steering device includes the main electric power source 100, the voltage boost circuit 40 that boosts the output voltage of the main electric power source 100, the subsidiary electric power source 50 connected in parallel with and between the voltage boost circuit 40 and the motor drive circuit 30, and an electric power source control portion 62 that is provided in the electronic control unit 60 and that controls the voltage boosted by the voltage boost circuit 40.

The main electric power source 100 is constructed by interconnecting in parallel a main battery 101 that is a common vehicle-mounted battery having a rated output voltage of 12 V, and an alternator 102 having a rated output voltage of 14 V which generates electricity by rotation of the engine. Therefore, the main electric power source 100 constitutes a vehicle-mounted electric power source of a 14-V system.

The main electric power source 100 supplies source power to not only the electric power steering device but also other vehicle-mounted electrical loads, such as headlights and the like. A power source supplier line 103 is connected to a power source terminal (positive terminal) of the main battery 101, and a grounding line 111 is connected to a ground terminal thereof.

The power source supplier line 103 branches into a control system power source line 104 and a drive system power source line 105. The control system power source line 104 functions as a power source line for supplying source power only to the electronic control unit 60. The drive system power source line 105 functions as a power source line for supplying source power to both the motor drive circuit 30 and the electronic control unit 60.

An ignition switch 106 is connected to the control system power source line 104. A power source relay 107 is connected to the drive system power source line 105. This power source relay 107 turns on by a control signal from the assist control portion 61 of the electronic control unit 60, so as to form an electric power supply circuit for the electric motor 20. The control system power source line 104 is connected to the source positive terminal of the electronic control unit 60, and has a diode 108 in an intermediate portion thereof that is to the load side (the electronic control unit 60 side) of the ignition switch 106. The diode 108 is a back-flow prevention element whose cathode is provided on the electronic control unit 60 side and whose anode is provided on the main electric power source 100 side, and which allows current to pass only in the direction of power source supply.

From the drive system power source line 105, a linkage line 109 branches which connects to the control system power source line 104 at the load side of the power source relay 107. The linkage line 109 is connected to the electronic control unit 60 side of the connecting location at which the diode 108 is connected to the control system power source line 104. Besides, a diode 110 is connected to the linkage line 109. This diode 110 is provided with its cathode connected to the control system power source line 104 side, and its anode connected to the drive system power source line 105 side. Therefore, a circuit construction is formed in which source power can be supplied from the drive system power source line 105 to the control system power source line 104 via the linkage line 109, but cannot be supplied from the control system power source line 104 to the drive system power source line 105. The drive system power source line 105 and the grounding line 111 are connected to the voltage boost circuit 40. Besides, the grounding line 111 is also connected to a grounding terminal of the electronic control unit 60.

A voltage sensor 51 is provided on the drive system power source line 105 between the voltage boost circuit 40 and the power source relay 107. The voltage sensor 51 is provided for detecting a state of being unable to supply source power from the main electric power source 100 to the electric motor 20. The voltage sensor 51 detects (measures) the voltage between the drive system power source line 105 and the grounding line 111, and outputs a signal of detection to the electric power source control portion 62, and, via the electric power source control portion 62, to the assist control portion 61. Hereinafter, this voltage sensor 51 will be termed the first voltage sensor 51, and the voltage value detected thereby will be termed the main power source voltage v1.

The voltage boost circuit 40 is constructed of a capacitor 41 provided between the drive system power source line 105 and the grounding line 111, a voltage-boosting coil 42 connected in series to the drive system power source line 105 on the load side of the connecting point of the capacitor 41, a first voltage-boosting switching element 43 connected between the drive system power source line 105 on the load side of the voltage-boosting coil 42 and the grounding line 111, a second voltage-boosting switching element 44 connected in series to the drive system power source line 105 on the load side of the connecting point of the first voltage-boosting switching elements 43, and a capacitor 45 connected between the drive system power source line 105 on the load side of the second voltage-boosting switching element 44 and the grounding line 111. A boosted-voltage power source line 112 is connected to the secondary side of the voltage boost circuit 40.

In this embodiment, the voltage-boosting switching elements 43, 44 are MOSFETs; however, other types of switching elements may also be used as the voltage-boosting switching elements 43, 44. Besides, as shown by circuit symbols in the diagram, each of the MOSFETs constituting the voltage-boosting switching elements 43, 44 has a parasitic diode as a part of its structure.

As for the voltage boost circuit 40, the voltage boost is controlled by the electric power source control portion 62 of the electronic control unit 60. The electric power source control portion 62 outputs pulse signals of a predetermined frequency to the gates of the first and second voltage-boosting switching elements 43, 44 to turn on and off the two switching elements 43, 44 so that the source power supplied from the main electric power source 100 is boosted in voltage and a predetermined output voltage is generated on the boosted-voltage power source line 112. In this case, the first and second voltage-boosting switching elements 43, 44 are controlled so that their on-off actions are opposite to each other. The voltage boost circuit 40, in operation, has the first voltage-boosting switching element 43 on and the second voltage-boosting switching element 44 off to let current flow through the voltage-boosting coil 42 only for a short time so that electric power is accumulated in the voltage-boosting coil 42, and then immediately have the first voltage-boosting switching element 43 off and the second voltage-boosting switching element 44 on so that the electric power accumulated in the voltage-boosting coil 42 is output.

The output voltage of the second voltage-boosting switching element 44 is smoothed by the capacitor 45. Therefore, a stable boosted-voltage source power is output from the boosted-voltage power source line 112. In this case, a plurality of capacitors of different frequencies may be connected in parallel to improve the smoothing characteristic. Besides, the capacitor 41 provided on the input side of the voltage boost circuit 40 removes the noise that would otherwise go to the main electric power source 100 side.

The boosted voltage (output voltage) of the voltage boost circuit 40 can be adjusted, for example, in the range of 20 V to 50 V, by the control of the duty ratio (PWM control) of the first and second voltage-boosting switching elements 43, 44. Incidentally, as the voltage boost circuit 40, it is permissible to use a general-purpose DC-DC converter.

The boosted-voltage power source line 112 branches into a boosted voltage drive line 113 and a charge/discharge line 114. The boosted voltage drive line 113 is connected to a power source input portion of the motor drive circuit 30. The charge/discharge line 114 is connected to a positive terminal of the subsidiary electric power source 50.

The subsidiary electric power source 50 is an electric storage device that stores electric power input from the voltage boost circuit 40, and that assists the main electric power source 100 by supplying source power to the motor drive circuit 30 when the motor drive circuit 30 needs a large amount of electric power. Besides, when the main electric power source 100 fails (loses its capacity of supplying source power), the subsidiary electric power source 50 is used so as to singly supply source power to the motor drive circuit 30. Therefore, the subsidiary electric power source 50 is constructed by connecting a plurality of electric storage cells in series so that a voltage corresponding to the boosted voltage of the voltage boost circuit 40 can be maintained. A grounding terminal of the subsidiary electric power source 50 is connected to the grounding line 111. As this subsidiary electric power source, it is permissible to use, for example, a capacitor (electric double layer capacitor).

The subsidiary electric power source 50 supplies source power also to the electronic control unit 60. When the source power supply from the main electric power source 100 to the electronic control unit 60 cannot be performed well, the subsidiary electric power source 50 supplies source power to the electronic control unit 60, in place of the main electric power source 100. Incidentally, the electronic control unit 60 has a voltage-lowering circuit (DC/DC converter, not shown) that lowers the voltage of the source power supplied from the subsidiary electric power source 50 and that is built in a power-receiving portion. Using this voltage-lowering circuit, the electronic control unit 60 adjusts the voltage to a proper voltage.

A voltage sensor 52 is provided on the output side of the voltage boost circuit 40. The voltage sensor 52 detects the voltage between the boosted-voltage power source line 112 and the grounding line 111, and outputs a signal commensurate with the detected value to the electric power source control portion 62. In this circuit construction, since the boosted-voltage power source line 112 and the charge/discharge line 114 are connected, the measurement value measured by the voltage sensor 52 is the higher voltage value of the output voltage (boosted voltage) of the voltage boost circuit 40 and the output voltage (power source voltage) of the subsidiary electric power source 50. Hereinafter, the voltage sensor 52 will be termed the second voltage sensor 52, and the voltage value detected thereby will be termed the output power source voltage v2.

The boosted voltage drive line 113 is provided with a current sensor 54 that detects the current that flows through the motor drive circuit 30. The current sensor 54 is connected to the electric power source control portion 62 of the electronic control unit 60, and outputs a signal that shows the measured value to the electric power source control portion 62. Hereinafter, this current sensor 54 will be termed the output current sensor 54, and the current value detected thereby will be termed the output current i2.

Besides, the charge/discharge line 114 is provided with a current sensor 53 that detects the current flowing through the subsidiary electric power source 50. The current sensor 53 is connected to the electric power source control portion 62 of the electronic control unit 60, and outputs a signal that shows the measured charge/discharge current isub, to the electric power source control portion 62. The current sensor 53 discriminates the directions of current, that is, the charge current that flows from the voltage boost circuit 40 to the subsidiary electric power source 50, and the discharge current that flows from the subsidiary electric power source 50 to the motor drive circuit 30, and measures the magnitude thereof. The charge/discharge current isub is represented by a positive value when flowing as a charge current, and is represented by a negative value when flowing as a discharge current. Hereinafter, the current sensor 53 will be termed the subsidiary power source current sensor 53, and the current value detected thereby will be termed the subsidiary power source current isub.

The electronic control unit 60 has, as a main portion, a microcomputer that has a built-in memory and the like. The functions of the electronic control unit 60 are roughly divided into the assist control portion 61 and the electric power source control portion 62. The assist control portion 61 is connected to the steering torque sensor 21, the rotation angle sensor 22, the motor current sensor 38, and a vehicle speed sensor 23, and receives inputs of sensor signals that show the steering torque Tx, the steering angle Ox, the motor current iuvw, and the vehicle speed Vx. The assist control portion 61, on the basis of these sensor signals, outputs a PWM control signal to the motor drive circuit 30 to control the driving of the electric motor 20 and therefore assist the driver in the steering operation.

The electric power source control portion 62 controls the charging and discharging of the subsidiary electric power source 50 by performing the voltage boost control of the voltage boost circuit 40. The electric power source control portion 62 is connected to the first voltage sensor 51, the second voltage sensor 52, the charge/discharge current sensor 53, and the output current sensor 54, and receives inputs of sensor signals that show the main power source voltage v1, the output power source voltage v2, the actual charge/discharge current isub, and the output current i2. On the basis of these sensor signals, the electric power source control portion 62 outputs a PWM control signal to the voltage boost circuit 40 so that the state of charge of the subsidiary electric power source 50 reaches a target state of charge. The voltage boost circuit 40 changes the boosted voltage, that is, the output voltage of the circuit 40, by controlling the duty ratios of the first and second voltage-boosting switching elements 43, 44 in accordance with the input PWM control signal. Incidentally, the electric power source control portion 62 stops the voltage boost operation of the voltage boost circuit 40 when a fail of the main electric power source 100 has been detected.

The assist control portion 61 and the electric power source control portion 62 give and receive information to and from each other. For example, information acquired by the electric power source control portion 62 (the main power source voltage v1, the output power source voltage v2, the actual charge/discharge current isub, and the output current i2) is supplied to the assist control portion 61.

Figure 2:
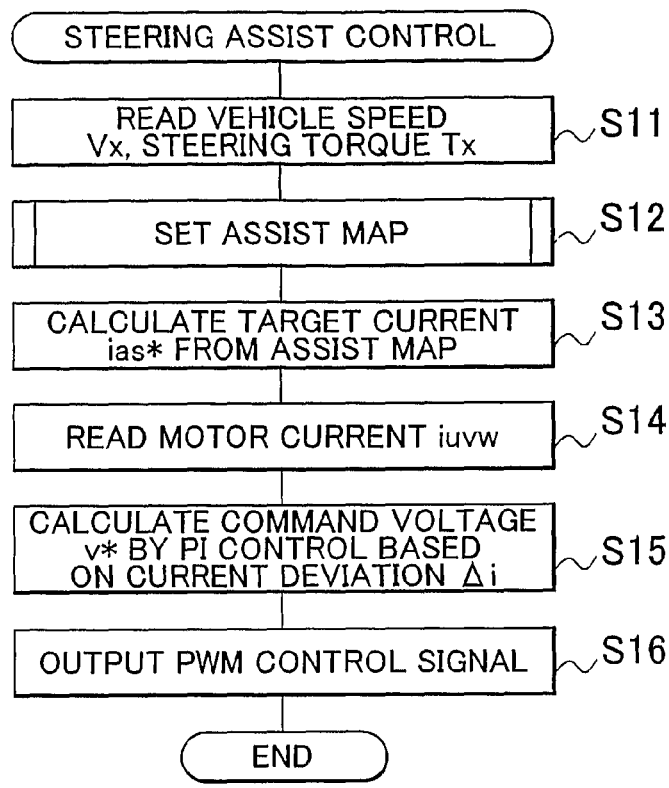
FIG. 2 is a flowchart representing a steering assist control routine in accordance with a first embodiment of the invention.

Next, a steering assist control process that the assist control portion 61 of the electronic control unit 60 performs will be described. FIG. 2 represents a steering assist control routine executed by the assist control portion 61. The steering assist control routine is stored as a control program within a ROM of the electronic control unit 60, and is started upon the turning-on of an ignition switch 106, and is repeatedly executed at every predetermined short cycle period.

When the control routine is started, the assist control portion 61 firstly in step S11 reads the vehicle speed Vx detected by the vehicle speed sensor 23, and the steering torque Tx detected by the steering torque sensor 21.

Figure 3:
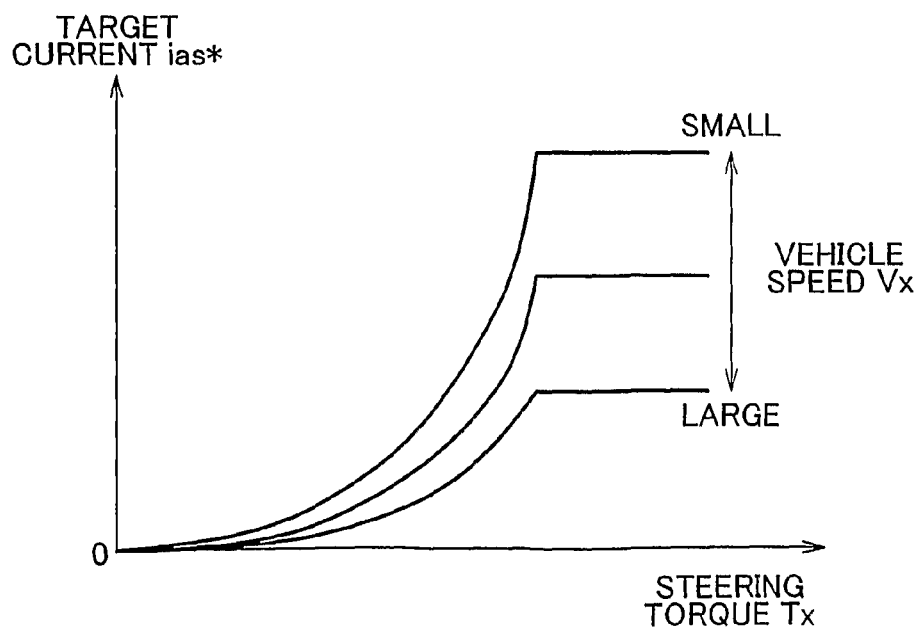
FIG. 3 is a characteristic diagram representing an assist map in accordance with the first embodiment of the invention.

Subsequently in step S12, the assist control portion 61 performs a process of setting an assist map. The assist map is a reference map for setting a target current value ias* of the electric motor on the basis of the vehicle speed Vx and the steering torque Tx, and is stored in the memory of the electronic control unit 60. In the assist map, as shown in FIG. 3, relations between the steering torque Tx and the target current value ias* are set so that the assist force increases with increases in the steering torque Tx. In this example, the relation between the steering torque Tx and the target current value ias* is changed also according to the vehicle speed Vx, and the target current value ias* is set at a value that is larger the lower the vehicle speed Vx. In this assist map, when the steering torque Tx is zero, the target current value ias* is set at zero. Furthermore, the target current value ias* is set so as to increase from zero in accordance with increases in the steering torque Tx. Besides, the target current value ias* is restricted to be less than or equal to the an upper-limit current value, irrespective of increases in the steering torque Tx. This assist map may correspond to an assist characteristic in which a relation between the steering torque and the motor control value (target current value) is set. Incidentally, the assist map shown in FIG. 3 represents the characteristic of the target current value ias* relative to the steering torque Tx in the rightward direction. As for the characteristic thereof in the leftward direction, merely the direction is opposite, and there is no difference in terms of absolute value from the characteristic shown in FIG. 3. Hereinafter, the target current value ias* will be termed the target current ias*.

The assist map-setting process in step S12 is a process of changing the assist map shown in FIG. 3 (hereinafter, sometimes termed the original map) in the case where the main electric power source 100 fails (when the main electric power source 100 loses its capacity of supplying source power to the electric motor 20). This assist map-setting process will be described later.

After performing the assist map-setting process in step S12, the assist control portion 61 calculates a target current ias* of the electric motor 20 that corresponds to the vehicle speed Vx and the steering torque Tx on the basis of the assist map in step S13. This target current ias* may correspond to a motor control value or a target current value. In this case, in order to factor in the compensation torque based on the steering angle θx, the steering speed ωx, etc., the target current ias* may be corrected by a corresponding amount. For example, the compensation torque may be the sum of the returning force of the steering shaft 12 toward a basic position which increases in proportion to the steering angle θx, and a back torque that corresponds to the resisting force against the rotation of the steering shaft 12 which increases in proportion to the steering speed ωx, and the target current ias* may be corrected to a target value that has factored in an amount corresponding to the compensation torque. For this calculation, the rotation angle (corresponding to the steering angle θx of the steering handle 11) of the electric motor 20 detected by the rotation angle sensor 22 is input. Besides, the steering speed ωx is found by differentiating the steering angle θx of the steering handle 11 with respect to time.

Next, in step S14, the assist control portion 61 reads from the motor current sensor 38 the motor current iuvw that flows through the electric motor 20. Subsequently in step S15, the assist control portion 61 calculates a deviation Δi of this motor current iuvw from the target current ias* having been calculated, and calculates a command voltage v* by a PI control (proportional-plus-integral control) based on the deviation Δi.

Then, in step S16, the assist control portion 61 outputs a PWM control signal commensurate with the command voltage v* to the motor drive circuit 30. After that, the assist control portion 61 temporarily ends the control routine. This control routine is repeatedly executed at every predetermined short cycle period. Therefore, through the execution of the control routine, the duty ratios of the switching elements 31 to 36 of the motor drive circuit 30 are controlled so that a desired steering assist force according to the driver's steering operation is obtained.

Incidentally, the foregoing feedback control of the electric motor 20 is performed by a vector control that is represented by a two-phase d-q-axis coordinate system in which the q axis represents the rotating direction of the electric motor 20 and the d axis represents the direction orthogonal to the rotating direction. Therefore, the assist control portion 61 is equipped with a 3-phase/2-phase coordinate conversion portion (not shown) that converts the three-phase motor current iuvw detected by the motor current sensor 38 into values in the d-q-axis coordinate system. Using the 3-phase/2-phase coordinate conversion portion, the assist control portion 61 converts the motor current iuvw into the d-axis current id and the q-axis current iq. Besides, in the setting of a target current ias*, too, the assist control portion 61 calculates a target current (Id*, Iq*) in the d-q-axis coordinate system. In this case, the q-axis current that causes the electric motor 20 to generate torque is set as a target current ias* from the assist map. Besides, in order to calculate a three-phase voltage command value (command voltage v*) that corresponds to the deviation (Id*−Id, Iq−Iq), the assist control portion 61 is equipped with a 2-phase/3-phase coordinate conversion portion (not shown). Using the 2-phase/3-phase coordinate conversion portion, the assist control portion 61 computes a three-phase command voltage v*.

However, the foregoing control that employs the d-q coordinate system does not necessarily characterize the embodiment. Therefore, in the following description of the embodiment, the target current is represented simply as ias*, and the motor current detected by the motor current sensor 38 is represented as iuvw.

Incidentally, in this steering assist control routine, the process (S11 to S13) in which the assist control portion 61 calculates the target current ias* on the basis of the assist map may correspond to control value computation means in the invention, and the process (S14 to S16) in which the assist control portion 61 controls the driving of the electric motor 20, and the motor drive circuit 30 may correspond to motor control means.

Particularly during execution of the foregoing steering assist control, the electric power steering device needs large amounts of electric power at the time of static steering operation, or at the time of operating the steering handle at low vehicle speed. However, it is not preferable to increase the capacity of the main electric power source 100 in preparation for a temporary large electric power consumption. Therefore, the electric power steering device of this embodiment is equipped with the subsidiary electric power source 50 that supplements the source power supply at the time of temporary large electric power consumption, instead of an increased capacity of the main electric power source 100. Besides, in order to efficiently drive the electric motor 20, a system that includes the voltage boost circuit 40, and supplies voltage-boosted power to the motor drive circuit 30 and the subsidiary electric power source 50 is constructed.

By the way, there is possibility of it becoming impossible to supply source power from the main electric power source 100 to the electric motor 20. Examples of the causes of this incident include a failure of the power source relay 107, a break of the drive system power source line 105, a bad connector connection of the power source line, etc. In such a case, the electric power steering device of this embodiment is able to continue the steering assist control by using only the subsidiary electric power source 50. However, this can be said to be an abnormal state of the electric power source device as a whole (an electric power source device that includes the main electric power source 100 and the subsidiary electric power source 50). Therefore, there is a need to cause the driver to be aware of the power source abnormality.

Generally, at the time of electric power source abnormality, an alarm device, such as a warning lamp or the like, operates. However, such an alarm alone is sometimes not sufficient to make the driver aware of it. In such a case, the state of charge of the subsidiary electric power source 50 dwindles, and when the system stops, the steering assist suddenly becomes null, which causes considerable discomfort to the driver. Therefore, in the electric power steering device of this embodiment, the assist map-setting process of step S12 is performed in order to certainly cause the driver to be aware of electric power source abnormality in an early period without causing considerable discomfort to the driver.

Figure 4:
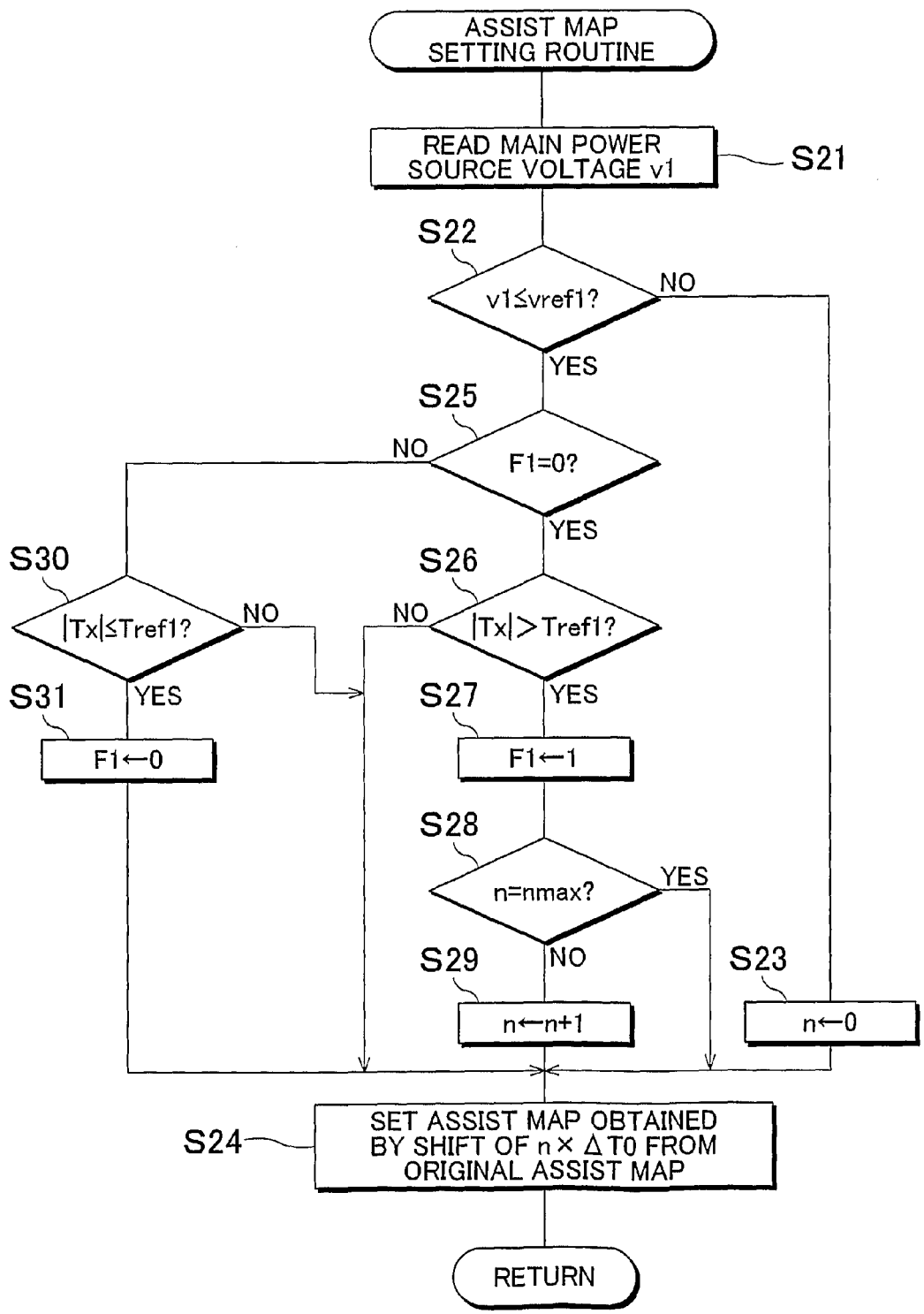
FIG. 4 is a flowchart representing an assist map setting routine in accordance with the first embodiment.

FIG. 4 is a flowchart representing an assist map setting routine. The flowchart of this assist map setting routine concretely represents the process of step S12 shown in FIG. 2. When the assist map setting routine is started, the assist control portion 61 firstly in step S21 reads a main power source voltage v1 detected by the first voltage sensor 51. Subsequently in step S22, the assist control portion 61 determines whether or not the main power source voltage v1 is less than or equal to a main-electric power source fail criterion voltage vref1. The main-electric power source fail criterion voltage vref1 is a set voltage for determining the presence/absence a failed state of the main electric power source 100, and is pre-stored in the ROM of the electronic control unit 60, or the like. The process of step S22 that the assist control portion 61 performs may correspond to electric power source abnormality detection means.

If the answer to the determination in step S22 is "NO", that is, if it is determined that the main electric power source 100 has not failed, the assist control portion 61 sets a variable n at value 0 (zero) (n=0) in step S23. The variable n, as can be understood from the process described later, is a numerical value that represents the number of steps by which the characteristic of the assist map is shifted relative to an original assist map shown in FIG. 3. Besides, when the assist map setting routine is started, the variable n is set at value 0.

Figure 5:
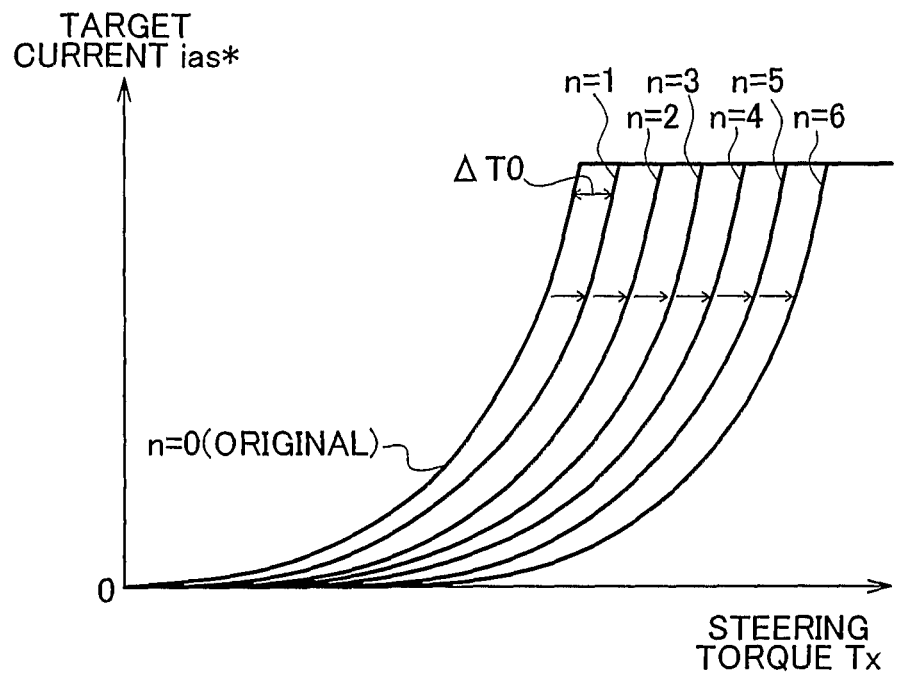
FIG. 5 is a characteristic diagram showing transition of the assist map in accordance with the first embodiment.

When the main electric power source 100 has failed, the assist map is adjusted so as to shift in such a direction that the steering torque Tx increases relative to the original assist map as shown in FIG. 5. That is, the characteristic of the assist map is adjusted to a characteristic that is obtained by shifting the characteristic waveform shown in FIG. 3 to a side of increases in the steering torque Tx (to the right-hand side in the graph). Incidentally, the map shown in FIG. 5 is a representation obtained by superimposing the original assist map for a specific vehicle speed Vx and a plurality of assist maps that are shifted stepwise from one another.

After setting the variable n at value 0 in step S23, the assist control portion 61 sets in step S24 an assist map obtained by shifting the steering torque Tx by n number of steps to the side of increase from the original assist map that corresponds to the vehicle speed Vx. The alteration in the characteristic of the assist map for each step is the shifting of the steering torque Tx by a constant unit shift amount $\Delta T0$. Therefore, in step S24, the assist control portion 61 sets an assist map by shifting the steering torque Tx by an amount of $n \times \Delta T0$ from the original assist map. If the main electric power source 100 is normal, n=0 and therefore the original assist map is selected.

When the process of step S24 is completed, the assist map setting routine temporarily ends, and the assist control portion 61 goes to the process of step S13 in the steering assist control routine (FIG. 2). This assist map setting routine is incorporated in the steering assist control routine, and is repeatedly executed at every predetermined short cycle period. Therefore, the presence/absence a failed state of the main electric power source 100 is repeatedly determined at every predetermined cycle period. Incidentally, the assist control portion 61 stores the value of the variable n into the memory when exiting the assist map setting routine.

If the answer to the determination in step S22 is "YES", that is, if it is determined that the main electric power source 100 has failed, the assist control portion 61 determines in step S25 whether or not a flag F1 is at "0" (zero). This flag F1 is "0" when the steering assist control routine is started, and is set to "1" each time a steering operation that satisfies a steering operation criterion condition described later is performed.

If it is determined that the flag F1 is "0" in step S25, the assist control portion 61 then determines in step S26 whether or not the magnitude of the steering torque Tx (|Tx|) detected by the steering torque sensor 21 is greater than a pre-set reference value Tref1. This determination is a process of determining whether or not the driver has performed a steering operation that satisfies the steering operation criterion condition. Therefore, the process of step S26 that the assist control portion 61 performs may correspond to abnormality-time steering operation determination means in the invention. If the answer to the determination in step S26 is "NO", that is, if the driver has not performed a steering operation that satisfies the steering operation criterion condition, the process proceeds to step S24. In this case, since n=0 has been set, the original assist map is set.

Thus, while the main electric power source 100 is in a failed state, the determination as to whether or not the magnitude of the steering torque Tx (|Tx|) is greater than a reference value Tref1 is repeatedly executed at every predetermined cycle period. Then, the magnitude of the steering torque Tx exceeding the reference value Tref1 is detected (YES in S26), the assist control portion 61 sets the flag F1 to "1" in step S27. Subsequently in step S28, the assist control portion 61 determines whether or not the value of the variable n has reached an upper-limit value nmax. This upper-limit value nmax is a value that restricts the number of steps of shifting the characteristic of the assist map. For example, in the example shown in FIG. 5, nmax=6 has been set, so that the characteristic of the assist map can be shifted relative to the original assist map by a maximum of six steps.

If in step S28 the value of the variable n has not reached the upper-limit value nmax (NO in S28), the assist control portion 61 increments the value of the variable n by 1 in step S29. On the other hand, if the value of the variable n has reached the upper-limit value nmax (YES in S28), the process of step S29 is skipped. Since the variable n is set at value 0 at the time of the first steering operation after a failed state of the main electric power source 100 has been detected, the value of the variable is changed to value 1 in step S29. After the variable n is thus set, the assist map whose characteristic is obtained by shifting the steering torque by n number of steps from the original assist map that is commensurate with the vehicle speed Vx is set in step S24. In this case, the torque region in which the target current ias* is set at zero broadens by an amount that corresponds to the shift of the steering torque Tx from the origin point of the assist map.

If the flag F1 is set to "1" upon detection of the driver's steering operation (YES in S26), the answer to the determination in step S25 becomes "NO" from the next cycle (the next control timing) on, so that the determination process of step S30 is repeatedly executed. In step S30, the assist control portion 61 determines whether or not the magnitude of the steering torque Tx (|Tx|) has declined to or below the reference value Tref1. While the magnitude of the steering torque Tx (|Tx|) has not declined to or below the reference value Tref1 (NO in S30), the assist control portion 61 immediately proceeds to step S24. Therefore, since the value of the variable n is not changed, the assist map of the same characteristic as in the previous cycle is set.

If the magnitude of the steering torque Tx (|Tx|) has declined to or below the reference value Tref1 (YES in S30) while the foregoing process is repeatedly executed, the assist control portion 61 resets the flag F1 to "0" in step S31, and then goes to the process of step S24. In this case, too, the characteristic of the assist map is not changed, but the determination regarding the magnitude of the steering torque Tx (|Tx|) (S26) is started again.

That is, in this embodiment, when the magnitude of the steering torque Tx (|Tx|) exceeds the reference value Tref1, it is determined that the driver has performed a steering operation, and then when the magnitude of the steering torque Tx (|Tx|) has declined to or below the reference value Tref1, it is determined that one whole performance of the steering operation has ended. Therefore, due to repeated performances of the process, each time a steering operation of the driver is detected, the value of the variable n is incremented by 1, and the characteristic of the assist map is correspondingly shifted by one step. That is, the value of the steering torque Tx corresponding to the target current ias* in the assist map is shifted to the increase side by one step at a time. This means that the target current ias* corresponding to the steering torque Tx is reduced by one step at every steering operation.

Incidentally, the reference value for determining whether or not one performance of the steering operation is completed (Tref1 in step S30) does not need to be the same value as the reference value Tref1 that is used to determine whether or not a steering operation has started, and it suffices that the reference value be less than or equal to Tref1. The determination process of step S30 may correspond to steering operation end determination means in the invention. It suffices that the steering operation end determination means, for example, determine that a steering operation has ended if the steering torque detected by the steering torque detection means has become equal to or less than a pre-set reference value.

In this embodiment, the unit shift amount ΔT0 remains the same at every shift, irrespective of the variable n, and is set at an amount that allows the driver to feel a change in the steering assist force due to a change of the characteristic. In this embodiment, the unit shift amount ΔT0 is set at or above 0.3 (N•m).

Figure 6:
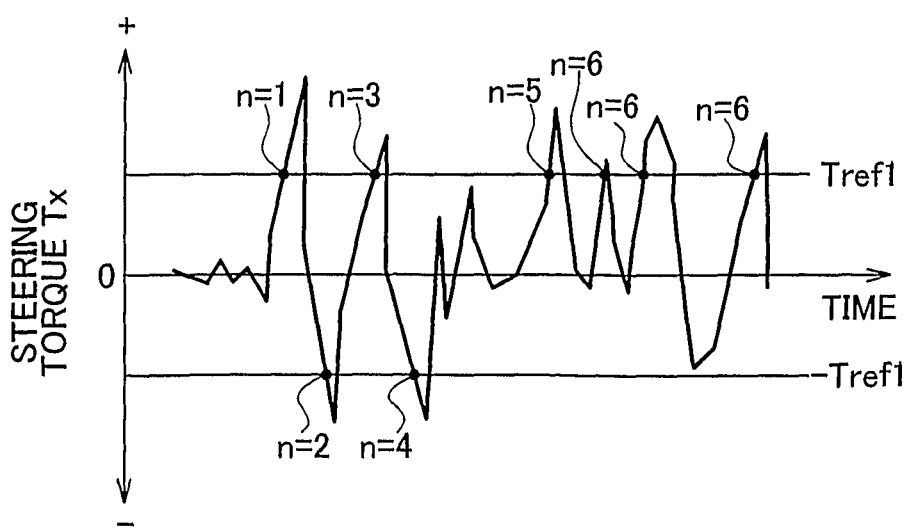
FIG. 6 is a graph showing transition of the steering torque in accordance with the first embodiment.

FIG. 6 is a graph representing transition of the steering torque Tx. In this graph, the values of the variable n incremented each time the magnitude of the steering torque Tx (|Tx|) crosses the reference value Tref1 from the small side to the large side. Although in this example, the upper-limit value nmax of the variable n is set at 6, it is also permissible to provide no upper-limit value nmax of the variable n so that the number of steps of shifting the characteristic of the assist map is not restricted.

According to the assist map-setting process in the embodiment, in the case where a failed state of the main electric power source 100 is detected, the driver's steering operation is monitored, and each time the driver performs a predetermined steering operation, the characteristic of the assist map is shifted relative to the original characteristic by one step in the steering torque Tx to the increase side. Therefore, each time the steering operation is performed, the target current ias* (motor control value) set corresponding to the steering torque Tx is reduced in a successive fashion. This means that the steering torque input to the steering handle 11 by the driver which is needed in order to obtain the steering assist force gradually increases. Therefore, each time the driver performs steering handle operation, the steering handle operation becomes heavier stepwise. This allows the driver to appropriately feel a decline of the assist force at each time of performing steering handle operation and therefore become aware of abnormality. Therefore, in an early stage following detection of the failed state of the main electric power source 100, the driver can cope with the failure, for example, have a repair or the like. Besides, since the steering assist force does not sharply decline, considerable discomfort is not caused to the driver.

Incidentally, the assist map setting routine that the assist control portion 61 performs may correspond to control value reduction means.

Next, two modifications of the first embodiment will be described. In these modifications, if it is estimated that the driver is in a situation of particularly needing steering assist, the decline in the steering assist force is restrained by lessening the amount of shift of the characteristic of the assist map (equivalent to the amount of reduction in the target current ias*).

Figure 7:
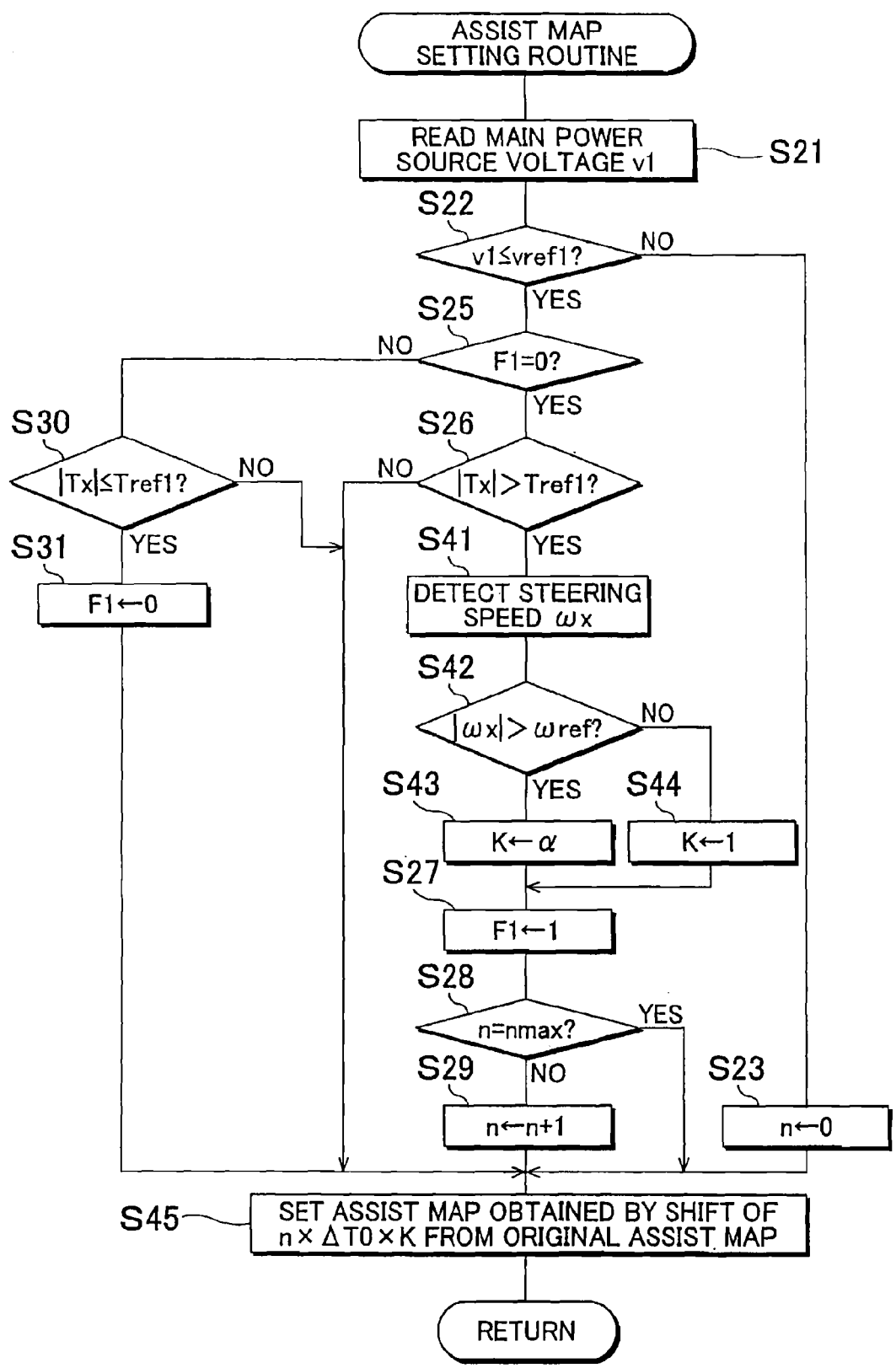
FIG. 7 is a flowchart representing an assist map setting routine in accordance with a first modification of the first embodiment.

FIG. 7 is a flowchart representing an assist map setting routine in accordance with a first modification of the first embodiment. In the assist map setting routine of the first modification, a process of steps S41 to S44 is added between step S26 and step S27 in the assist map setting routine of the first embodiment, and the processing content of step S24 is changed to that of step S45. Therefore, the processes in the first modification that are the same as those in the first embodiment are represented in FIG. 7 by the same step numbers as in the first embodiment, and descriptions thereof are omitted below.

If the assist control portion 61 detects that the magnitude of the steering torque Tx (|Tx|) has exceeded the reference value Tref1 (YES in S26) while the main electric power source 100 is in a failed state, the assist control portion 61 calculates the then steering speed ωx in step S41. The steering speed ωx can be found by time-differentiating the steering angle θx obtained from the output signal of the rotation angle sensor 22. Subsequently in step S42, it is determined whether or not the magnitude of the steering speed ωx (|ωx|) is greater than a reference steering speed ωref.

The case where the magnitude of the steering speed ωx is greater than the reference steering speed ωref (YES in S42) is the case where the driver has performed a fast steering operation. In this case, it is estimated that the driver is in a situation of particularly needing steering assist, and the assist control portion 61 sets a reduction coefficient K to α in step S43. The reduction coefficient K is a coefficient for decreasing the unit shift amount ΔT0 for the shifting of the assist map relative to the original assist map. Besides, α is pre-set at a numerical value that is less than 1, which may be zero. That is, α is set at a numerical value within the range of 0≤α<1. On the other hand, in the case where the magnitude of the steering speed ωx is less than or equal to the reference steering speed ωref (NO in S42), it is estimated that the driver is in a situation in which the driver does not necessarily need steering assist, and the assist control portion 61 sets the reduction coefficient K to 1.

After setting the reduction coefficient K as described above, the assist control portion 61 sets the value of the variable n (S28 to S29) as in the first embodiment, and then sets an assist map in step S45. In this case, the amount of shift of the steering torque Tx relative to the original assist map is set at n×ΔT0×K. Therefore, in the case where the driver performs a fast steering operation (K=α), the shift amount is reduced and therefore the amount of reduction of the target current ias* lessens, as compared with the case where the driver does not do so (K=1). As a result, even when the main electric power source 100 has failed, good steering assist can be obtained in the case where the driver is in a situation of particularly needing steering assist. Therefore, safety improves, for example, in the case where an emergency steering operation for avoidance of the contact with another vehicle, or the like, becomes needed.

Incidentally, in the first modification, even in the case where the driver has performed a fast steering operation (K=α), the steering assist force obtained becomes less the larger the variable n becomes. However, if it is desired that large steering assist force be always obtained, the value of α may be set at 0. Besides, although in the first modification, the entire shift amount (n×ΔT0) is multiplied by the reduction coefficient K, it is also permissible to multiply only the amount of one shift at the time of detection of a fast steering operation by the reduction coefficient K.

The process of steps S41 to S45 that the assist control portion 61 performs may correspond to reduction amount restriction means.

Figure 8:
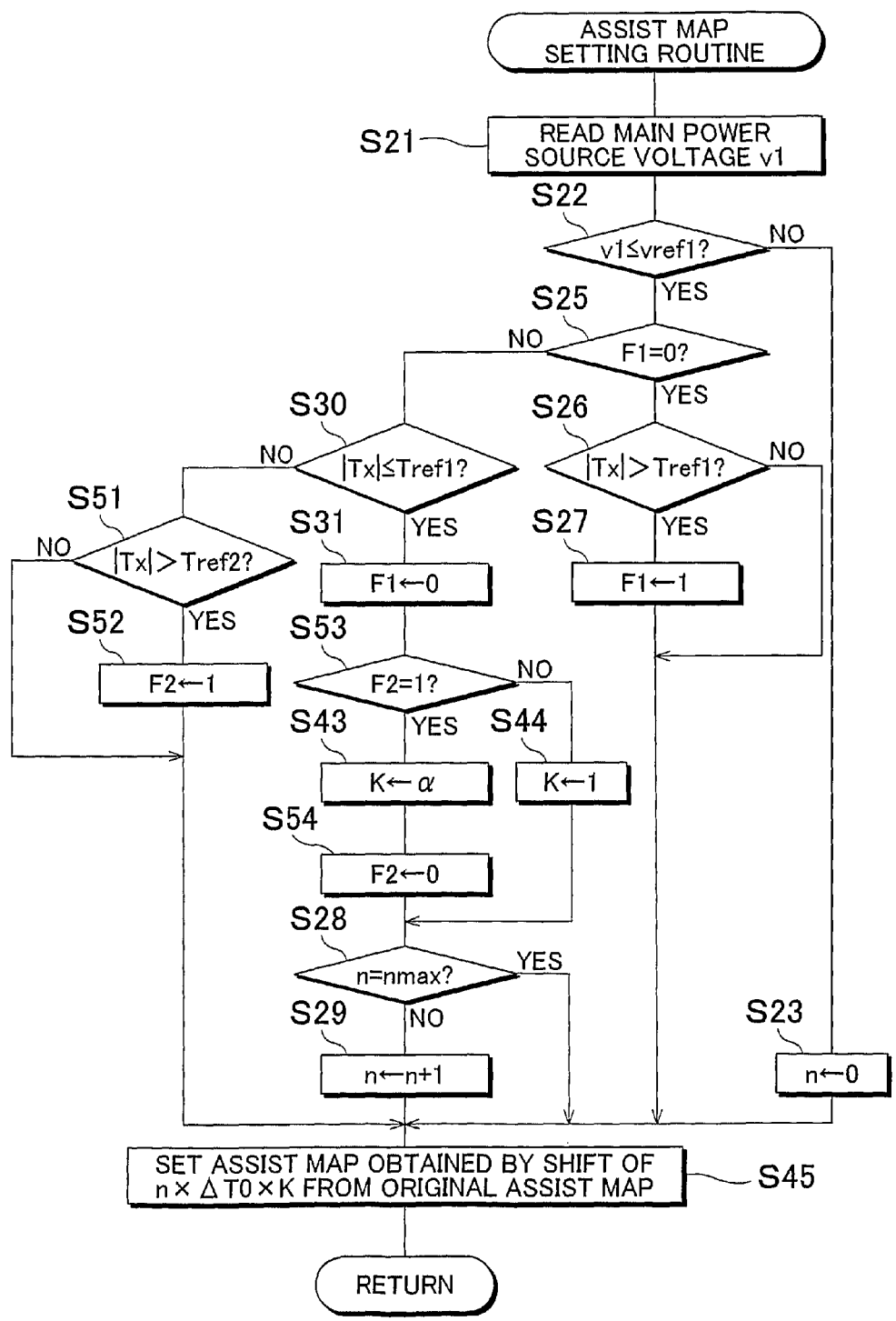
FIG. 8 is a flowchart representing an assist map setting routine in accordance with a second modification of the first embodiment.

Next, a second modification of the first embodiment will be described. FIG. 8 is a flowchart representing an assist map setting routine in accordance with the second modification of the first embodiment. In the second modification, when a strong steering torque is input to the steering handle 11, it is estimated that the driver is in a situation of particularly needing steering assist, and the reduction of the steering assist force is restrained. To that end, a reference value Tref2 (>Tref1) that is larger than the reference value Tref1 used in the first embodiment is used. When the steering torque Tx exceeds the reference value Tref2, it is estimated that the driver is in a situation of particularly needing steering assist. Hereinafter, the reference value Tref1 is termed the first reference value Tref1, and the reference value Tref2 is termed the second reference value Tref2.

In the second modification, the reduction coefficient K is set on the basis of the result of determination regarding the magnitude of the steering torque Tx, and the determination as to whether or not the steering torque Tx has exceeded the second reference value Tref2 is performed after it is detected that the steering torque Tx has exceeded the first reference value Tref1. Therefore, the second embodiment is different from the first embodiment in the timing of characteristic alteration of the assist map. Hereinafter, processes in the second modification that are the same as those of the first embodiment or the first modification are represented in the FIG. 8 by the same step numbers as in the first embodiment or the first modification, and descriptions thereof are omitted below.

As in the first embodiment, the assist control portion 61 sets the value of the variable n at 0 to select the original assist map (S22 to S23, and S45) while the failed state of the main electric power source 100 is not detected. In the case where the failed state of the main electric power source 100 is detected, the assist control portion 61 checks the state of the flag F1 (S25). If it is determined that flag F1=0 (YES in S25), the assist control portion 61 determines whether or not the magnitude of the steering torque Tx (|Tx|) is greater than the first reference value Tref1 (S26). If the magnitude of the steering torque Tx (|Tx|) is not greater than the first reference value Tref1 (NO in S26), the assist control portion 61 immediately selects the original assist map (S45). If it is determined that the magnitude of the steering torque Tx (|Tx|) has exceeded the first reference value Tref1 (YES in S26), the assist control portion 61 sets the flag F1 to "1".

After setting the flag F1 to "1", the assist control portion 61 determines in step S30 whether or not the magnitude of the steering torque Tx (|Tx|) has declined to the first reference value Tref1. While the magnitude of the steering torque Tx (|Tx|) has not declined to the first reference value Tref1 (NO in S30), the assist control portion 61 determines in step S51 whether or not the magnitude of the steering torque Tx (|Tx|) has risen to exceed a pre-set second reference value Tref2. That is, step S51 is a process of estimating whether or not the driver is in a situation of particularly needing steering assist by determining whether or not the magnitude of the steering torque Tx (|Tx|) has risen beyond the second reference value Tref2 above the first reference value Tref1.

In the case where the magnitude of the steering torque Tx (|Tx|) is not above the second reference value Tref2, the assist control portion 61 immediately performs the process of step S45, and ends the present execution of this routine. Since this routine is repeatedly executed at every predetermined short cycle period, the processes of determination in step S30 and step S51 are repeated from the next cycle on as long as the main electric power source 100 is in the failed state.

If while the determination processes described above are repeatedly performed, the magnitude of the steering torque Tx (|Tx|) is found to have exceeded the second reference value Tref2, the assist control portion 61 sets the flag F2 to "1" in step S52. After that, if the magnitude of the steering torque Tx (|Tx|) declines to the first reference value Tref1 (YES in S30), the assist control portion 61 proceeds to step S31. On the other hand, if the magnitude of the steering torque Tx (|Tx|) declines to the first reference value Tref1 without exceeding the second reference value Tref2, the assist control portion 61 proceeds to step S31 without setting the flag F2 to "1". This flag F2 is set at "0" when the routine is started, and is set to "1" each time the steering torque Tx exceeds the second reference value Tref2 during one performance of steering operation, that is, each time it is estimated that the driver is in a situation of particularly needing steering assist.

The assist control portion 61 resets the flag F1 to "0" in step S31. Subsequently in step S53, the assist control portion 61 determines whether or not the flag F2 is "1". If it is determined flag F2=1, the assist control portion 61 sets the reduction coefficient K to α (0≤α<1) in step S43, and resets the flag F2 to "0" in step S54. On the other hand, if flag F2=0, the assist control portion 61 sets the reduction coefficient K to 1 in step S44.

After setting the reduction coefficient K as described above, the assist control portion 61 sets the value of the variable n (S28 to S29) as in the first embodiment, and sets an assist map in step S45. In this case, the amount of shift of the steering torque Tx relative to the original assist map is set to n×ΔT0×K. Therefore, in the case where the driver has strongly performed steering operation (K=α), the shift amount is reduced and the amount of reduction of the target current ias* lessens, as compared with the case where the driver does not do so (K=1). As a result, even when the main electric power source 100 has failed, good steering assist can be obtained in the case where the driver is in a situation of particularly needing steering assist. Therefore, safety improves, for example, in the case where an emergency steering operation for avoidance of the contact with another vehicle, or the like, becomes needed.

Incidentally, in the second modification, even in the case where the driver has strongly performed steering operation (K=α), the steering assist force obtained becomes less the larger the variable n becomes. However, if it is desired that large steering assist force be always obtained, this can be achieved by setting the value of α to 0. Besides, although in the second modification, the entire shift amount (n×ΔT0) is multiplied by the reduction coefficient K, it is also permissible to multiply only the amount of one shift at the time of detection of a fast steering operation by the reduction coefficient K.

The processes of steps S51 to 53, and steps S43 to S45 that the assist control portion 61 perform may correspond to reduction amount restriction means.

Next, a second embodiment will be described. In the first embodiment and its modifications described above, the characteristic of the assist map is shifted to a side of increase of the steering torque Tx in order to reduce the control value used for performing the steering assist. In the second embodiment, however, an upper-limit value of the target current ias* in the assist map is reduced stepwise.

Figure 9:
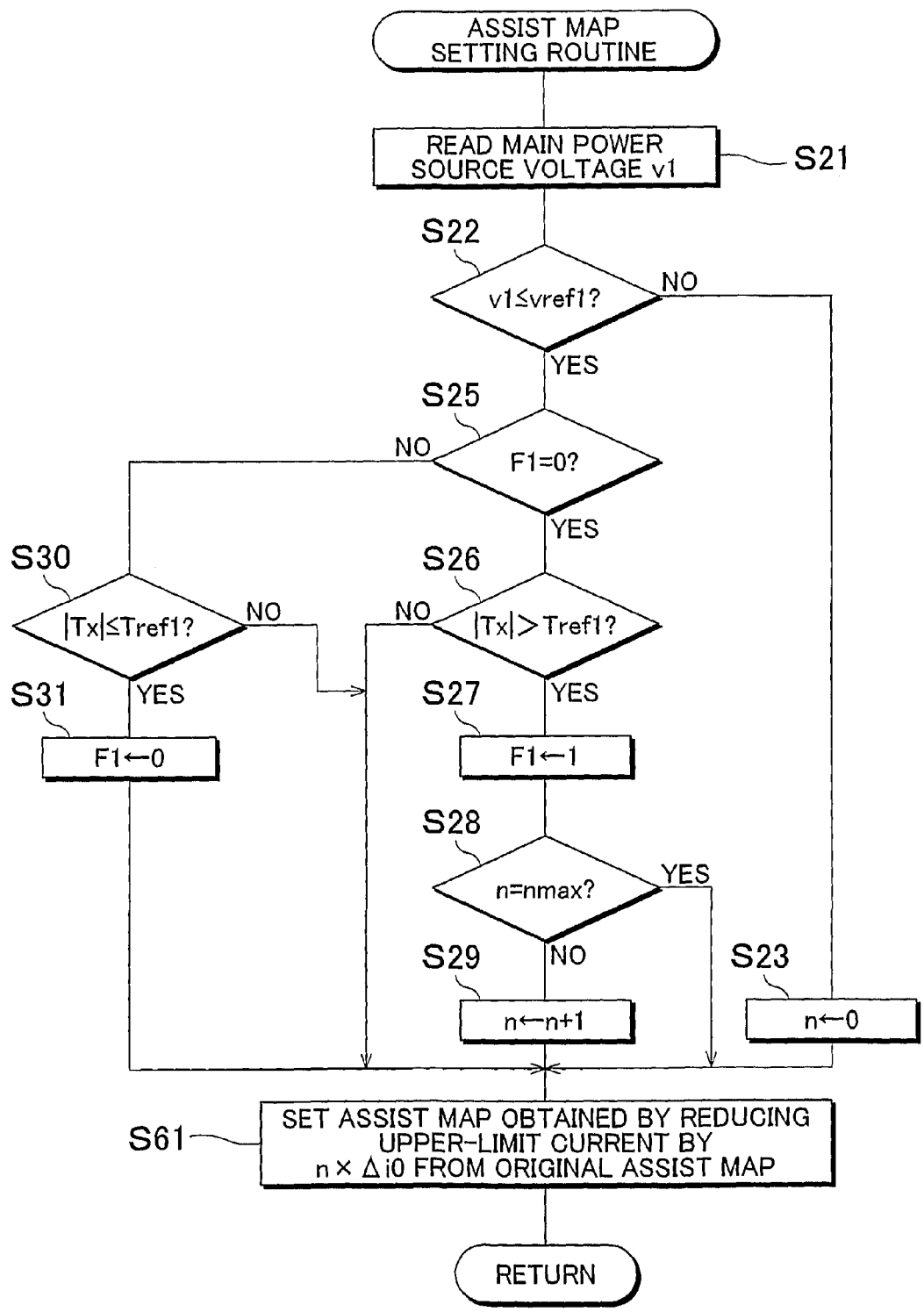
FIG. 9 is a flowchart representing an assist map setting routine in accordance with a second embodiment of the invention.

FIG. 9 is a flowchart that represents an assist map setting routine in accordance with the second embodiment. In the assist map setting routine of the second embodiment, the process of step S24 in the assist map setting routine of the first embodiment is changed to the process of step S61. Therefore, the processes in the first modification that are the same as those in the first embodiment are represented in FIG. 9 by the same step numbers as in the first embodiment, and descriptions thereof are omitted below.

In the case where a failed state of the main electric power source 100 is detected (YES in S22), the assist control portion 61 determines whether or not the magnitude of the steering torque Tx (|Tx|) has exceeded the reference value Tref1 (S26). Each time the magnitude of the steering torque Tx (|Tx|) exceeds the reference value Tref1 (YES in S26), the assist control portion 61 increments the value of the variable n by 1. After the variable n is set, the assist control portion 61 sets an assist map commensurate with the variable n in step S61.

Figure 10:
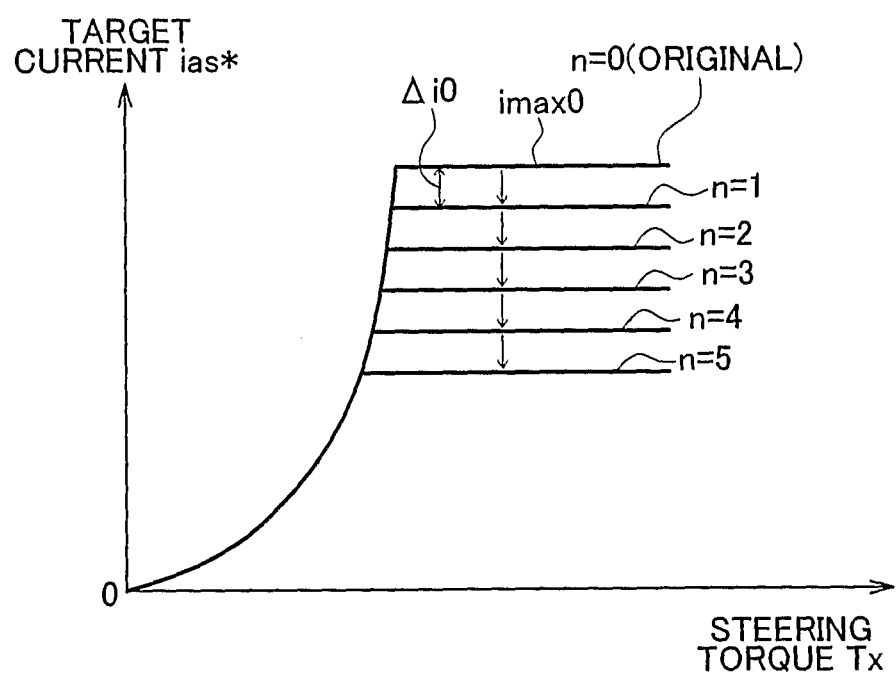
FIG. 10 is a characteristic diagram showing transition of an upper-limit current in the assist map in accordance with the second embodiment.

In the foregoing assist map, a region in which the target current ias* does not increase relative to increases in the steering torque |Tx| is set, that is, an upper-limit value imax of the target current ias* (which may correspond to an upper-limit current value) is set. In step S61 in the second embodiment, upper-limit values imax obtained by reducing the upper-limit value imax0 of the original assist map by a value obtained by multiplying the variable n by a unit reduction amount Δi0 (n×Δi0) (imax=imax0−n×Δi0) as shown in FIG. 10. Incidentally, although in this example, the unit reduction amount Δi0 of the upper-limit value imax is set at a constant value, the unit reduction amount Δi0 does not necessarily need to be a constant value, but may be changed according to the variable n.

Therefore, during the failed state of the main electric power source 100, each time the driver performs a steering operation that satisfies the steering operation criterion condition, the upper-limit value imax of the target current ias* is reduced by one step. Therefore, the target current ias* set corresponding to the steering torque Tx in a high torque region is reduced by one step at a time. Besides, along with the reduction by one step at a time, the region of the steering torque Tx in which the target current ias* is restricted by the upper-limit value imax (the high torque region) expands toward the low torque side. This increases the incidence of the target current ias* being restricted by the upper-limit value imax, thus making it possible to cause the driver to be aware that the assist force gradually decreases. As a result, in an early stage following detection of the failed state of the main electric power source 100, the driver can cope with the failure, for example, have a repair or the like. Besides, since the assist force does not sharply decline, considerable discomfort is not caused to the driver.

Incidentally, in the second embodiment, the amount of reduction of the upper-limit value imax of the target current ias* may also be decreased in the case where it is estimated that the driver is in a situation of particularly needing steering assist, as in the first and second modifications of the first embodiment. For example, in the assist map setting routine shown in FIG. 7 (first modification) or FIG. 8 (second modification), the process of step S45 is replaced with a process of setting the upper-limit value imax of the target current ias* so that the upper-limit value imax reduces from the upper-limit value imax0 of the original assist map by an amount (n×Δi0×K). Due to this process, even during the failed state of the main electric power source 100, the restriction of the upper-limit current is weakened so as to provide good steering assist in the case where steering assist is particularly needed. Therefore, safety improves, for example, in the case where an emergency steering operation for avoidance of the contact with another vehicle, or the like, becomes needed.

Next, a third embodiment will be described. In the first embodiment and its modifications described above, the characteristic of the assist map is shifted to the side of increase of the steering torque Tx in order to reduce the motor control value used for performing the steering assist. In the third embodiment, however, an upper-limit electric power Pmax that restricts the electric power consumption of the electric motor 20 is reduced stepwise.

The output of the electric motor 20 is proportional to the multiplication product of the steering assist torque and the steering speed. Besides, the output of the electric motor 20 is restricted by restricting the electric power consumption thereof. Therefore, in the case where the electric power consumption of the electric motor 20 is restricted, the faster the steering speed, the less the steering assist torque becomes in inverse proportion. The tenacious feel that the driver perceives when turning the steering handle 11 at fast rate increases. Through the utilization of this, in the third embodiment, during the failed state of the main electric power source 100, the upper-limit electric power Pmax of the electric motor 20 is reduced to increase the tenacious feel and therefore cause the driver to be aware of the abnormality each time steering operation is performed.

Figure 11:
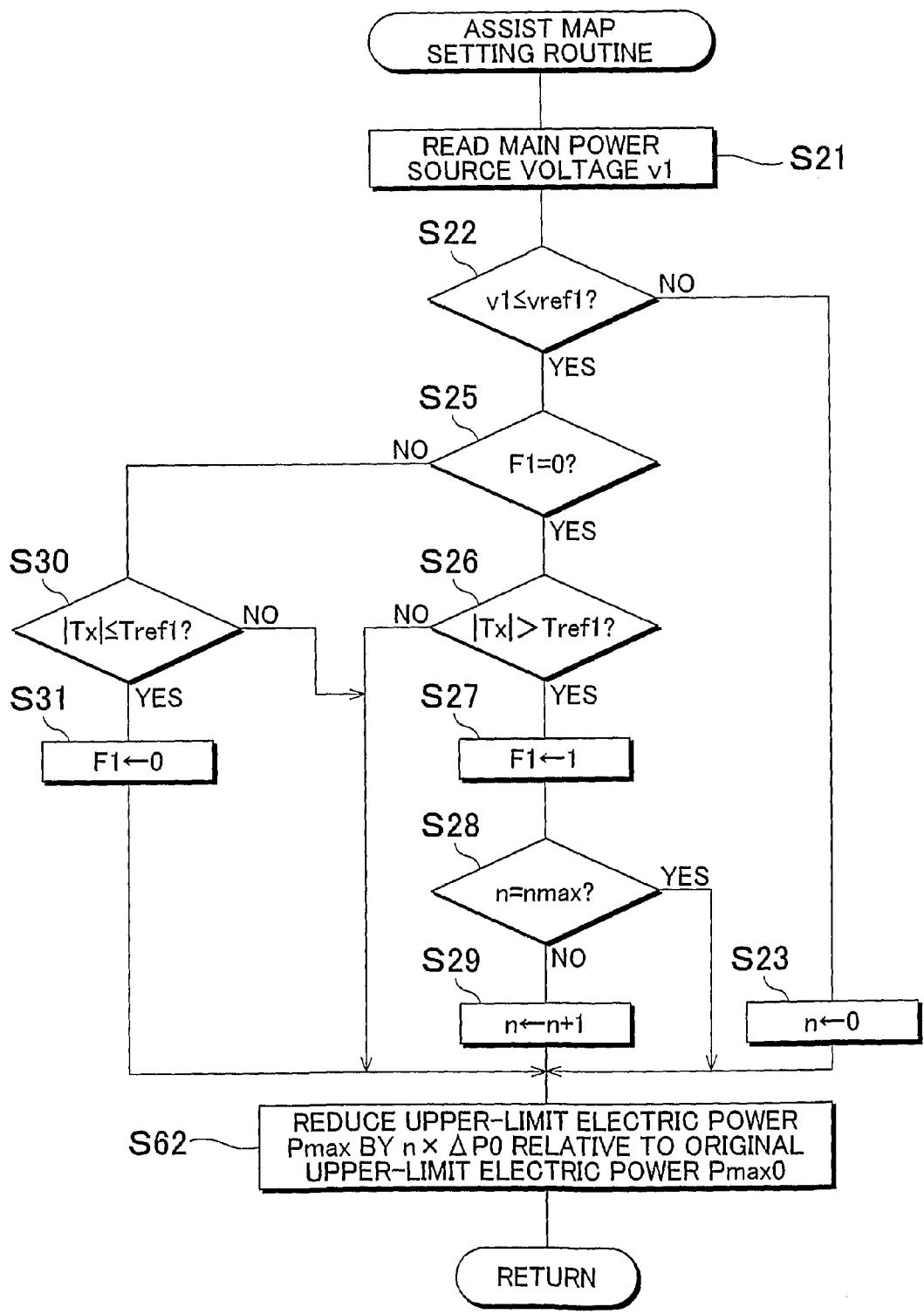
FIG. 11 is a flowchart representing an upper-limit electric power setting routine in accordance with a third embodiment of the invention.

FIG. 11 is a flowchart representing an upper-limit electric power setting routine in the third embodiment. This upper-limit electric power setting routine is incorporated as step S102 in a steering assist control routine (FIG. 13) described below. Firstly, the upper-limit electric power setting routine will be described. The upper-limit electric power setting routine is obtained by changing the step S24 in the assist map setting routine of the first embodiment to step S62. Therefore, the processes in the third modification that are the same as those in the first embodiment are represented in FIG. 11 by the same step numbers as in the first embodiment, and descriptions thereof are omitted below.

In the case where the failed state of the main electric power source 100 is detected (YES in S22), the assist control portion 61 determines whether or not the magnitude of the steering torque Tx (|Tx|) has exceeded the reference value Tref1 (S26). Each time the magnitude of the steering torque Tx (|Tx|) exceeds the reference value Tref1 (YES in S26), the assist control portion 61 increments the variable n by value 1 (S28 to S29). After the variable n is set, the assist control portion 61 sets an upper-limit electric power Pmax of the electric motor 20 commensurate with the variable n in step S62. The upper-limit electric power Pmax of the electric motor 20 represents the upper-limit value of the electric power consumption of the electric motor 20.

Figure 12:
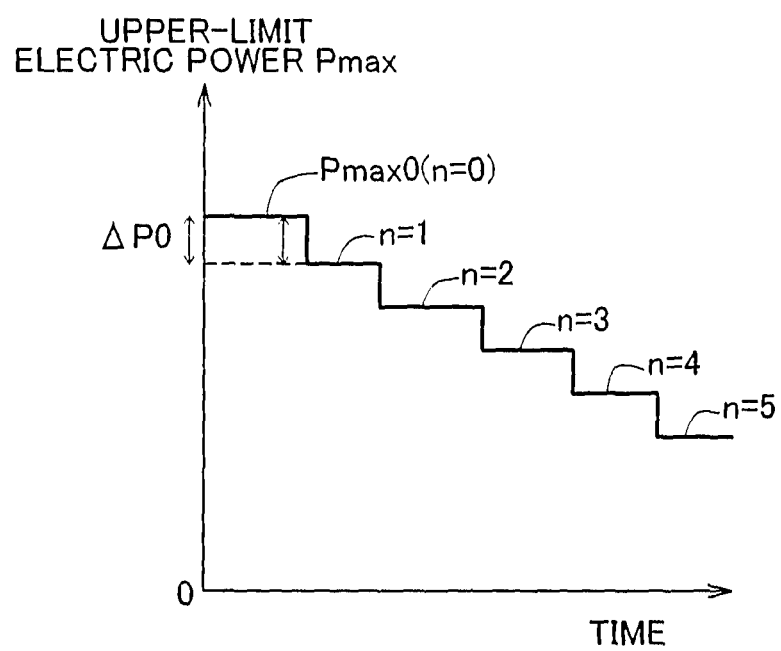
FIG. 12 is a graph showing transition of the upper-limit electric power in accordance with the third embodiment.

In step S62, an upper-limit electric power Pmax is set by subtracting a value obtained by multiplying the variable n by a unit reduction amount ΔP0 (n×ΔP0) from the upper-limit electric power Pmax0 set when the failed state of the main electric power source 100 is not detected (hereinafter, termed the original upper-limit electric power Pmax0) (Pmax=Pmax0−n×ΔP0). Therefore, during the failed state of the main electric power source 100, the upper-limit electric power Pmax is reduced by the unit reduction amount ΔP0 each time the variable n is increased as shown in FIG. 12. Although in this example, the unit reduction amount ΔP0 of the upper-limit value Pmax is set at a constant value, the unit reduction amount ΔP0 does not necessarily need to be a constant value, but may be changed according to the variable n.

Figure 13:
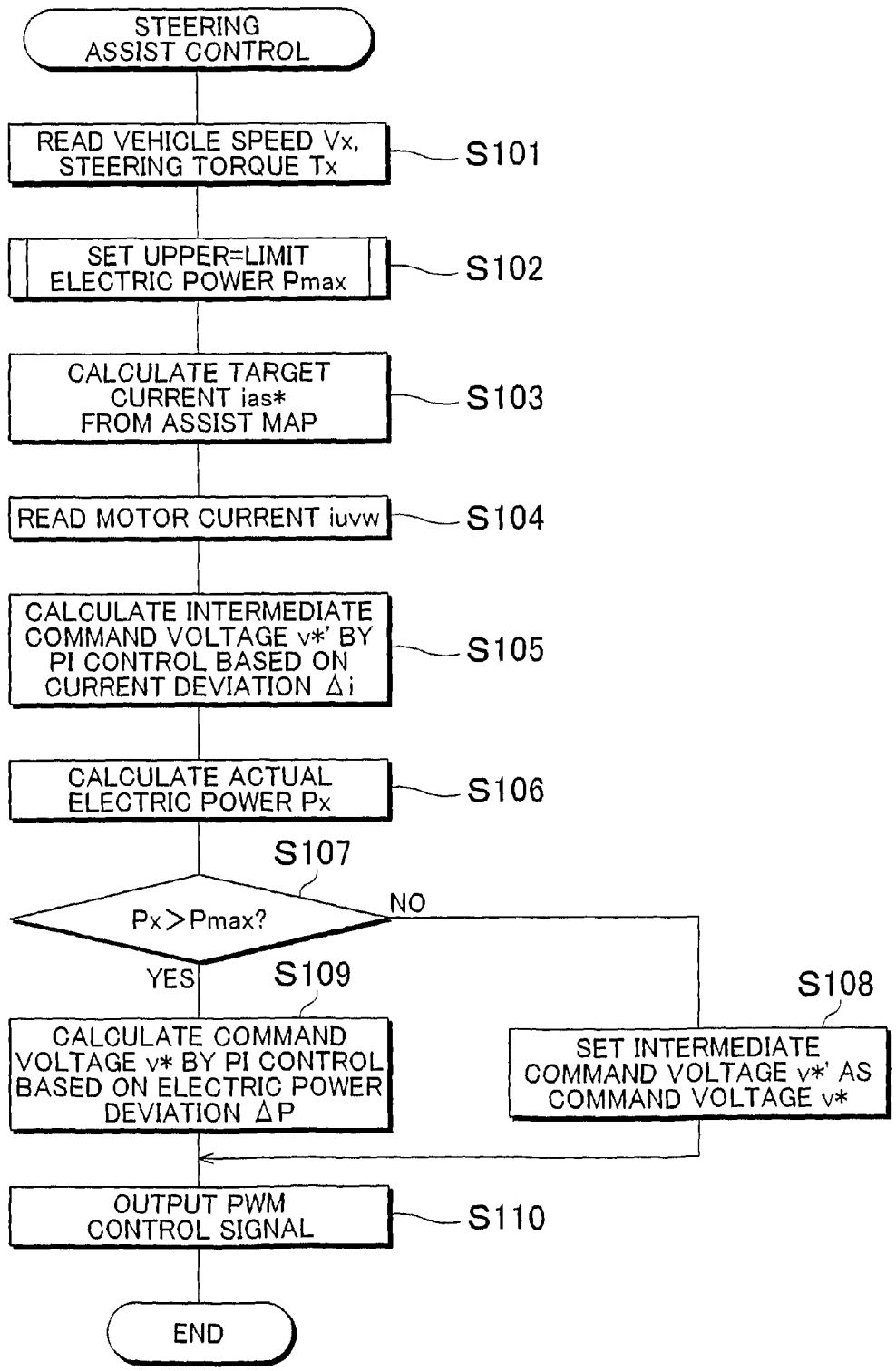
FIG. 13 is a flowchart representing a steering assist control routine in accordance with the third embodiment.

The upper-limit electric power setting routine is incorporated as step S102 in a steering assist control routine shown in FIG. 13. Hereinafter, a steering assist control routine in accordance with the third embodiment will be described. The steering assist control routine is stored as a control program in the ROM of the electronic control unit 60, and is started upon the turning-on of the ignition switch 106, and is repeatedly executed at every predetermined short cycle period.

When the control routine is started, the assist control portion 61 firstly in step S101 reads the vehicle speed Vx detected by the vehicle speed sensor 23, and the steering torque Tx detected by the steering torque sensor 21. Subsequently in step S102, the foregoing upper-limit electric power-setting process is performed.

Next, in step S103, the assist control portion 61 calculates the target current ias* of the electric motor 20 that corresponds to the vehicle speed Vx and the steering torque Tx on the basis of the assist map. The assist map used in this case is the original assist map shown in FIG. 3. Incidentally, in order to factor in a compensation torque based on the steering angle, the steering speed, etc., the target current ias* obtained from the assist map may be corrected by an amount that corresponds to the compensation torque.

Next, in step S104, the assist control portion 61 reads from the motor current sensor 38 a motor current iuvw that flows through the electric motor 20. Subsequently in step S105, the assist control portion 61 calculates a deviation Δi between this motor current iuvw and the target current ias* having been calculated, and calculates an intermediate command voltage v*' by a PI control (proportional-plus-integral control) based on the deviation Δi.

Subsequently in step S106, the assist control portion 61 calculates an electric power that is consumed by the electric motor 20 (termed the actual electric power Px). In this case, the assist control portion 61 reads an output power source voltage v2 detected by the second voltage sensor 52, and an output current i2 detected by the output current sensor 54, and calculates an actual electric power Px from a product (v2×i2) of the output power source voltage v2 and the output current i2.

Subsequently, the assist control portion 61 proceeds to step S107, in which the assist control portion 61 determines whether or not the actual electric power Px is greater than an upper-limit electric power Pmax. As the upper-limit electric power Pmax, the value set in step S102 is used. In the case where the actual electric power Px is not greater than the upper-limit electric power Pmax (NO in S107), the process proceeds to step S108, in which the assist control portion 61 sets as a command voltage v* the intermediate command voltage v*' calculated beforehand in step S105. On the other hand, in the case where the actual electric power Px is greater than the upper-limit electric power Pmax (YES in S107), the process proceeds to step S109, in which the assist control portion 61 calculates a deviation ΔP between the actual electric power Px and the upper-limit electric power Pmax, and calculates a command voltage v* by the PI control (proportional-plus-integral control) based on the deviation ΔP. That is, the command voltage v* is feedback-controlled so that the deviation ΔP becomes zero. In this case, the command voltage v* declines below the intermediate command voltage v*', and the actual electric power Px is restricted so as not to exceed the upper-limit electric power Pmax.

After the command voltage v* is calculated, the assist control portion 61 outputs a PWM control signal commensurate with the command voltage v* to the motor drive circuit 30 in step S110, and then temporarily ends the control routine. This control routine is repeatedly executed at every predetermined short cycle period. Therefore, through the execution of the control routine, the duty ratios of the switching elements 31 to 36 of the motor drive circuit 30 are controlled so that a steering assist force commensurate with the driver's steering operation is obtained. Besides, the electric power consumption of the electric motor 20 is feedback-controlled so as not to exceed the upper-limit electric power Pmax.

According to the third embodiment, during the failed state of the main electric power source 100, each time the driver performs a steering operation that satisfies the steering operation criterion condition, the upper-limit value Pmax of the electric power consumption of the electric motor 20 is reduced by the unit reduction amount ΔP0, and accordingly the tenacious feel at the time of turning the steering handle 11 gradually increases. As a results, the driver can be caused to be aware of the abnormality. Besides, since the steering assist force does not sharply decline, considerable discomfort is not caused to the driver. In the third embodiment, too, each time a steering operation that satisfies the steering operation criterion condition is performed, the target current ias* that corresponds to the steering torque Tx set in the assist map is reduced.

In the third embodiment, the amount of reduction of the upper-limit value Pmax of the electric power consumption of the electric motor 20 may be decreased in the case where it is estimated that the driver is in a situation of particularly needing steering assist, as in the first and second modifications of the first embodiment. For example, in the assist map setting routine shown in FIG. 7 (first modification) or FIG. 8 (second modification), the process of step S45 is replaced with a process of setting the upper-limit value imax of the target current ias* so that the upper-limit value imax of the target current ias* reduces from the original upper-limit value imax0 by an amount (n×ΔP0×K). Due to this process, even during the failed state of the main electric power source 100, the restriction of the output of the electric motor 20 is weakened so as to provide good steering assist in the case where steering assist is particularly needed. Therefore, safety improves, for example, in the case where an emergency steering operation for avoidance of the contact with another vehicle, or the like, becomes needed.

Next, a fourth embodiment will be described. In the first to third embodiments, the motor control value is reduced stepwise each time the driver performs a complete steering operation that satisfies the steering operation criterion condition. In the fourth embodiment, however, the characteristic of the assist map is continuously changed while the driver is performing a steering operation that satisfies the steering operation criterion condition.

Figure 14:
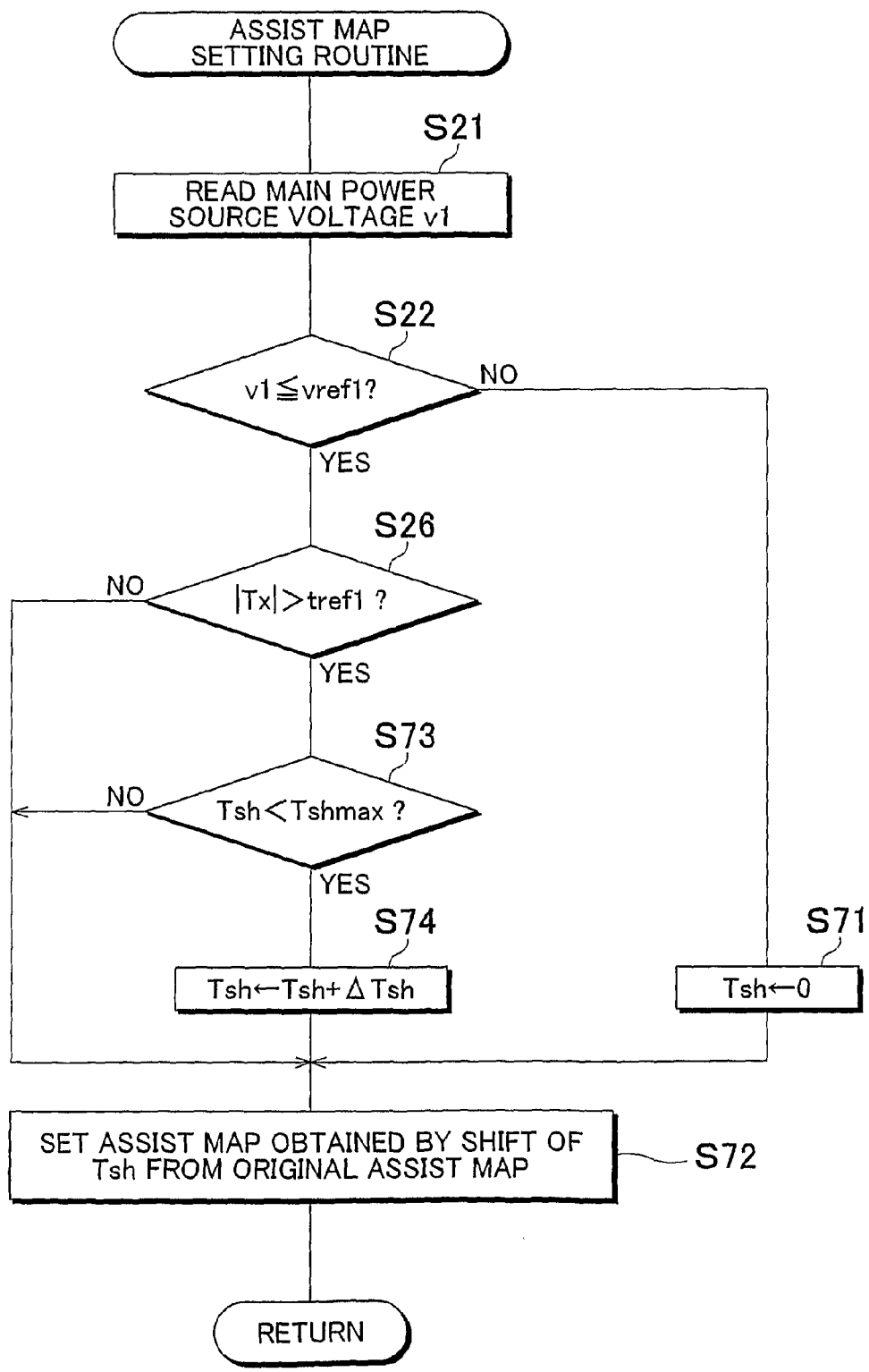
FIG. 14 is a flowchart representing an assist map setting routine in accordance with a fourth embodiment of the invention.

FIG. 14 is a flowchart representing an assist map setting routine in accordance with the fourth embodiment. This assist map setting routine represents the process of step S12 in the steering assist control routine shown in FIG. 2, as in the first embodiment. Hereinafter, the processes in the assist map setting routine of the fourth embodiment which are the same as those in the assist map setting routine of the first embodiment are represented in FIG. 14 by the same step numbers as in the first embodiment, and will be only briefly described below.

When the assist map setting routine is started, the assist control portion 61 reads the main power source voltage v1 (S21), and determines whether or not the main power source voltage v1 is less than or equal to the main-electric power source fail criterion voltage vref1 (S22). If the main power source voltage v1 is above the main-electric power source fail criterion voltage vref1 (NO in S22), the assist control portion 61 proceeds to step S71, in which the amount of shift Tsh by which the characteristic of the assist map is shifted relative to the original assist map shown in FIG. 3 so that the steering torque Tx is shifted in a direction of increase is set at value 0 (zero).

After setting the amount of shift Tsh at value 0 in step S71, the assist control portion 61 then sets in step S72 an assist map obtained by shifting the steering torque Tx by the amount of shift Tsh to the side of increase from the original assist map that corresponds to the vehicle speed Vx, and ends the present execution of this routine. In this case, since the amount of shift Tsh=0, the original assist map is selected. That is, in the case where the main electric power source 100 is normal, the original assist map selected.

This assist map setting routine is incorporated in the steering assist control routine, and is repeatedly executed at every predetermined short cycle period. The assist control portion 61, when temporarily ending the assist map setting routine, stores the value of the amount of shift Tsh into the memory.

On the other hand, in the case where main power source voltage v1 is less than or equal to the main-electric power source fail criterion voltage vref1 (YES in S22), that is, in the case where the main electric power source 100 has failed, the assist control portion 61 determines whether or not the magnitude of the steering torque Tx (|Tx|) is greater than the reference value Tref1. In the case where the magnitude of the steering torque Tx (|Tx|) is not greater than the reference value Tref1, the assist control portion 61 immediately proceeds to the process of step S72. In step S72, the assist map is set by using the amount of shift Tsh that is stored at the end of the immediately previous execution cycle of the routine. Therefore, in a situation where the main electric power source 100 has just failed and where the driver has not performed a steering operation that satisfies the steering operation criterion condition, the amount of shift Tsh=0, so that the original assist map is selected.

While the main electric power source 100 is in the failed state, the determination as to whether the magnitude of the steering torque Tx (|Tx|) is greater than the reference value Tref1 is repeatedly executed at every predetermined cycle period. Then, in the case where the magnitude of the steering torque Tx (|Tx|) has exceeded the reference value Tref1 (YES in S26), the assist control portion 61 determines in step S73 whether or not the amount of shift Tsh is less than a maximum amount of shift Tshmax. If the amount of shift Tsh is less than the maximum amount of shift Tshmax (YES in S73), the assist control portion 61 increases the amount of shift Tsh by a unit shift amount ΔTsh in step S74. On the other hand, if the amount of shift Tsh is greater than or equal to the maximum amount of shift Tshmax (NO in S73), the assist control portion 61 does not increase the amount of shift Tsh. The unit shift amount ΔTsh is set at a very small amount since the assist map setting routine is repeatedly executed at every very short cycle period.

Then, the assist control portion 61 sets in step S72 an assist map obtained by shifting the steering torque Tx by the amount of shift Tsh to the side of increase from the original assist map that corresponds to the vehicle speed Vx, and then ends the present execution of this routine.

Therefore, as the assist map setting routine is repeatedly executed, the characteristic of the assist map is continuously changed so that the steering torque Tx relative to the target current ias* gradually increases, while the driver is inputting to the steering handle 11 a steering torque that is greater than the reference value Tref1 during a period in which the main electric power source 100 is in the failed state. Besides, while the driver is inputting to the steering handle a steering torque that is greater than the reference value Tref1, the characteristic of the assist map is not changed. Incidentally, the determination process of step S26 in the assist map setting routine of the fourth embodiment may correspond to abnormality-time steering operation determination means and steering operation end determination means in the invention.

Figure 15:
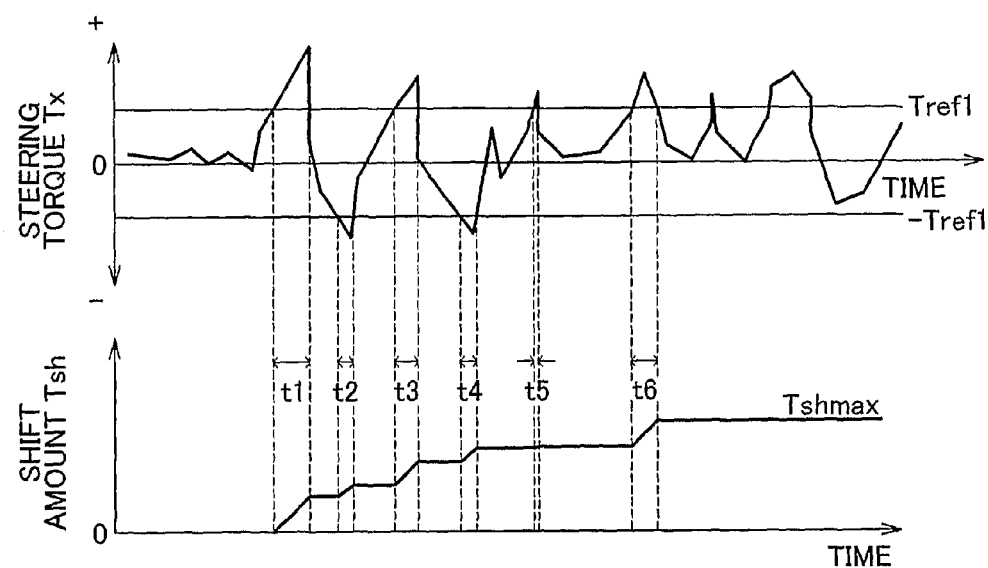
FIG. 15 is a graph showing transition of the amount of shift of the assist map in accordance with the fourth embodiment.
Figure 16:
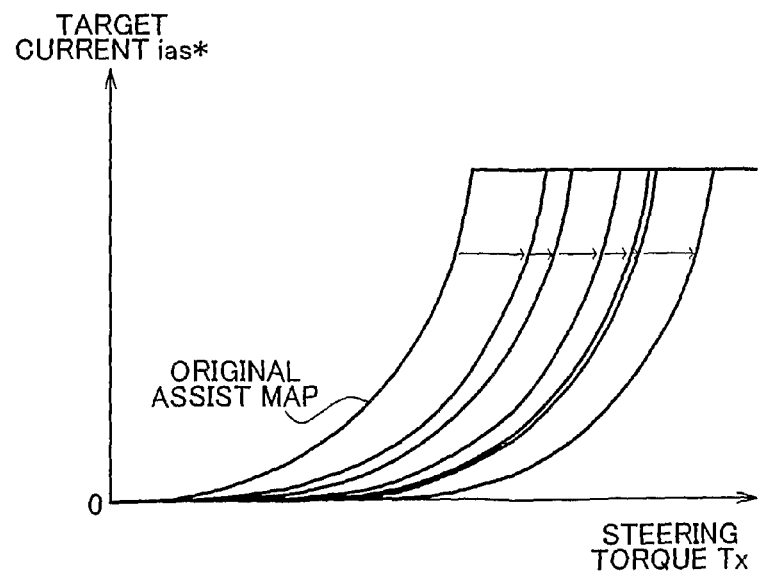
FIG. 16 is a characteristic diagram showing transition of the assist map in accordance with the fourth embodiment.

FIG. 15 is a graph representing transition of the steering torque Tx during the failed state of the main electric power source 100, and transition of the amount of shift Tsh that increases according to the transition of the steering torque Tx. Besides, FIG. 16 represents an assist map whose characteristic is changed according to the amount of shift Tsh. In FIG. 15, tn (n=1 to 6) each represent periods during which the driver is performing a steering operation that satisfies the steering operation criterion condition, and n represents the number of times of performing the steering operation after the main electric power source 100 has failed. Besides, in FIG. 16, assist maps that are used when one performance of steering operation has ended are represented in a superimposed fashion.

Thus, during the period in which the main electric power source 100 is in the failed state, the characteristic of the assist map is changed so that the target current ias* calculated with respect to the steering torque Tx decreases, while the driver is performing a steering operation that satisfies the steering operation criterion condition. Therefore, each time the driver performs a steering handle operation, the driver certainly perceives that the steering assist force is reducing, and therefore can become aware of the abnormality during the steering handle operation. Therefore, in an early stage following detection of the failed state of the main electric power source 100, the driver can cope with the failure, for example, have a repair or the like. Besides, since the steering assist force does not sharply decline, considerable discomfort is not caused to the driver.

While the electric power steering devices as embodiments of the invention have been described, the invention is not limited to the foregoing embodiments, but various modifications and the like are possible as long as they do not depart from the purpose of the invention.

Figure 17:
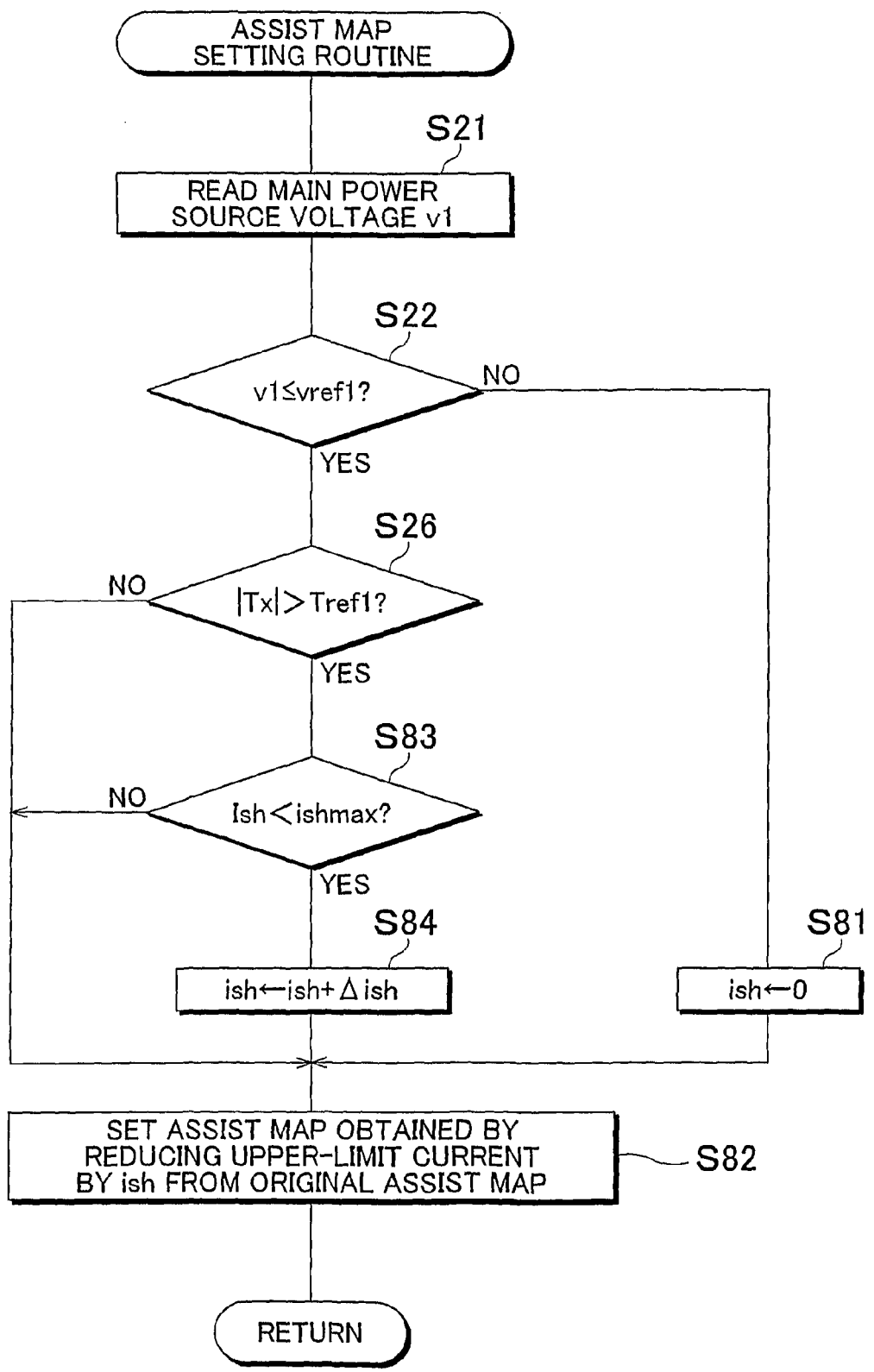
FIG. 17 is a flowchart representing an assist map setting routine in accordance with a modification of the second embodiment.

For example, although the second embodiment has a construction in which the upper-limit value of the target current ias* is reduced stepwise, it is permissible to adopt a construction in which the upper-limit value of the target current ias* is continuously reduced while the driver is performing a steering operation that satisfies the steering operation criterion condition. Herein, a modification of the second embodiment will be described using a flowchart shown in FIG. 17. In an assist map setting routine of the modification of the second embodiment, steps S71 to S74 in the assist map setting routine of the fourth embodiment are replaced by steps S81 to S84, and other processes are the same as in the fourth embodiment. Therefore, the same processes as those in the fourth embodiment are represented in FIG. 17 by the same step numbers as those used in the flowchart of the fourth embodiment, and descriptions thereof are omitted below.

In this modification, in the case where the main electric power source 100 is not in a failed state, the reduction amount ish by which the upper-limit value imax0 of the target current ias* is reduced relative to the original assist map is set at value 0 in step S81. On the other hand, in the case where the main electric power source 100 is in a failed state, if the driver is performing a steering operation that satisfies the steering operation criterion condition (YES in S26), it is determined in step S83 whether or not the reduction amount ish is less than a maximum reduction amount ishmax. If the reduction amount ish is less than the maximum reduction amount ishmax (YES in S83), the reduction amount ish is increased by a unit reduction amount Δish (small amount) in step S84. If the reduction amount ish is greater than or equal to the maximum reduction amount ishmax (NO in S83), the reduction amount ish is not increased. Then, in step S82, an assist map obtained by reducing the upper-limit value imax0 of the target current ias* is reduced by the reduction amount ish from the original assist map that corresponds to the vehicle speed Vx is set.

Therefore, in this modification, during a period in which the main electric power source 100 is in the failed state, the upper-limit value imax of the target current ias* gradually decreases while the driver is performing a steering operation that satisfies the steering operation criterion condition. As a result, the driver can be caused to become aware that the steering assist force is gradually decreasing. Thus, this modification can achieve an effect similar to that of the second embodiment.

Figure 18:
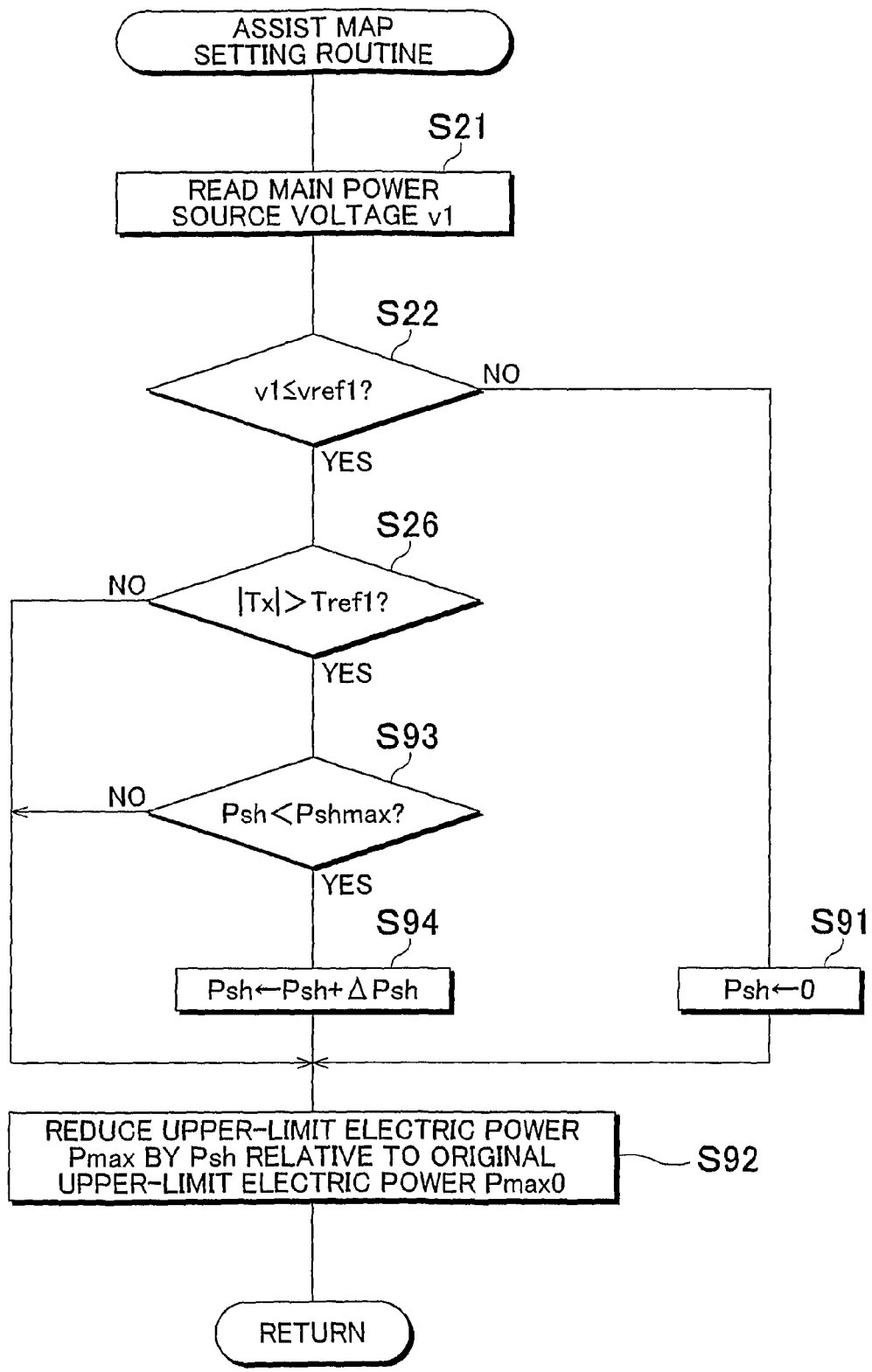
FIG. 18 is a flowchart representing an upper-limit electric power setting routine in accordance with a third embodiment of the modification.

Likewise, in the third embodiment, too, it is possible to adopt a construction in which while the driver is performing a steering operation that satisfies the steering operation criterion condition, the upper-limit electric power Pmax of the electric motor 20 is continuously reduced. A modification of the third embodiment will be described using a flowchart shown in FIG. 18. In an upper-limit electric power setting routine of the modification of the third embodiment, steps S71 to S74 in the assist map setting routine of the fourth embodiment are replaced by steps S91 to S94, and other processes are the same as in the fourth embodiment. Therefore, the same processes as those in the fourth embodiment are represented in FIG. 18 by the same step numbers as those used in the flowchart of the fourth embodiment, and descriptions thereof are omitted below.

In this modification, in the case where the main electric power source 100 is not in a failed state, the reduction amount Psh by which the upper-limit electric power Pmax is reduced relative to the original upper-limit electric power Pmax0 is set at value 0 in step S91. On the other hand, in the case where the main electric power source 100 is in a failed state, if the driver is performing a steering operation that satisfies the steering operation criterion condition (YES in S26), it is determined in step S93 whether or not the reduction amount Psh is less than a maximum reduction amount Pshmax. If the reduction amount Psh is less than the maximum reduction amount Pshmax (YES in S93), the reduction amount Psh is increased by a unit reduction amount ΔPsh (small amount) in step S94. If the reduction amount Psh is greater than or equal to the maximum reduction amount Pshmax (NO in S93), the reduction amount Psh is not increased. Then, in step S92, an upper-limit value Pmax obtained by reducing the upper-limit electric power Pmax of the electric motor 20 by the reduction amount Psh from the original upper-limit electric power Pmax0.

Therefore, in this modification, during a period in which the main electric power source 100 is in the failed state, the upper-limit electric power Pmax of the electric motor 20 gradually decreases while the driver is performing a steering operation that satisfies the steering operation criterion condition. As a result, the tenacious feel at the time of turning the steering handle 11 gradually increases, so that the driver can be caused to become aware of the abnormality. Thus, substantially the same effects as those of the third embodiment can be achieved.

Besides, although in the first embodiment and the fourth embodiment, the characteristic of the assist map is changed by shifting the steering torque Tx to the side of increase, other constructions may also be adopted. For example, the generation of the steering assist force may be reduced by multiplying the target current ias of the original assist map by a reduction coefficient A ($0 \leq A < 1$).

Besides, although in the embodiments, the main electric power source 100 and the subsidiary electric power source 50 are provided as electric power source devices, it is also permissible to adopt a construction that the subsidiary electric power source 50 is not provided. In this case, it suffices to detect abnormality of the main electric power source 100, for example, a decline of the power source voltage, or the like, and to perform the foregoing steering assist control.

Besides, although in the embodiment, an assist map that sets a relation between the steering torque Tx and the target current ias* is stored as an assist characteristic, a function that derives a target current ias* from the steering torque Tx, or the like may also be stored as an assist characteristic.

Besides, for example, in the fourth embodiment, the unit shift amount is set at a constant value. However, the unit shift amount may be variable on the basis of the steering speed ωx. That is, it is also possible to adopt a construction in which in the case where the magnitude of the steering speed ωx (|ωx|) is greater than a reference steering speed cord, it is determined that the driver is in a situation of particularly needing steering assist, and the characteristic change amount of the assist map is reduced by multiplying the unit shift amount ΔTsh by a reduction coefficient K ($0 \leq K < 1$). Besides, instead of the unit shift amount ΔTsh, the unit reduction amount Δish of the upper-limit value imax of the target current ias* may be utilized. Besides, instead of the unit shift amount ΔTsh, the unit reduction amount ΔPsh of the upper-limit electric power Pmax may be utilized.

Similarly, in the fourth embodiment, the unit shift amount ΔTsh may be variable on the basis of the steering torque Tx. That is, it is also possible to adopt a construction in which in the case where the magnitude of the steering torque Tx (|Tx|) is greater than the second reference value Tref2, it is determined that the driver is in a situation of particularly needing steering assist, and the characteristic change amount of the assist map is reduced by multiplying the unit shift amount ΔTsh by the reduction coefficient K ($0 \leq K < 1$) from the time point at which the magnitude |Tx| exceeds the second reference value Tref2. Besides, instead of the unit shift amount ΔTsh, the unit reduction amount Δish of the upper-limit value imax of the target current ias* may be utilized. Besides, instead of the unit shift amount ΔTsh, the unit reduction amount ΔPsh of the upper-limit electric power Pmax may be utilized.

The invention claimed is:

1. A vehicle steering device comprising:
a steering mechanism that steers a wheel of a vehicle upon steering operation of a steering handle;
an electric motor that is supplied with source power from an electric power source device and that generates assist force that assists in the steering operation of the steering handle;
a steering torque detection unit that detects steering torque that a driver of the vehicle inputs to the steering handle;
a control value computation unit that stores an assist characteristic that sets a motor control value that corresponds to the steering torque, and computes the motor control value based on the assist characteristic;
a motor control unit that controls driving of the electric motor so that if the motor control value is larger, a larger assist force is generated, based on the motor control value computed by the control value computation unit;
an electric power source abnormality detection unit that detects abnormality of source power supply capability of the electric power source device;
an abnormality-time steering operation determination unit that determines whether or not a steering operation that satisfies a pre-set steering operation criterion condition has been started if the abnormality of the source power supply capability of the electric power source device has been detected by the electric power source abnormality detection unit; and
a control value reduction unit that reduces the motor control value that corresponds to the steering torque by one step, if the abnormality-time steering operation determination unit determines that the steering operation that satisfies the steering operation criterion condition has been started,
wherein the abnormality-time steering operation determination unit determines that the steering operation that satisfies the steering operation criterion condition has been started, if the steering torque detected by the steering torque detection unit is greater than a pre-set reference value.

2. The vehicle steering device according to claim 1, wherein the abnormality-time steering operation determination unit repeatedly determines whether or not the steering operation that satisfies the steering operation criterion condition has been started, and the control value reduction unit reduces the motor control value that corresponds to the steering torque each time the abnormality-time steering operation determination unit determines that the steering operation that satisfies the steering operation criterion condition has been started.

3. The vehicle steering device according to claim 1, wherein:
the motor control value is a target current value of the electric motor;
the assist characteristic sets a relation between the steering torque and the target current value such that the target current value has a characteristic of increasing with an increase in the steering torque; and
the control value reduction unit reduces the motor control value that corresponds to the steering torque by shifting value of the steering torque relative to the target current value in the assist characteristic to a side of increase.

4. The vehicle steering device according to claim 3, wherein
the control value computation unit stores a plurality of steps of assist characteristics that are gradually shifted from one another in value of the steering torque to the side of increase; and
the control value reduction unit shifts the value of the steering torque relative to the target current value in the assist characteristic by one step to the side of increase each time the abnormality-time steering operation determination unit determines that the steering operation that satisfies the steering operation criterion condition has been started.

5. The vehicle steering device according to claim 4, wherein an amount of shift by which the value of the steering torque relative to the target current value in the assist characteristic is shifted by one step to the side of increase is a pre-set amount, and is a value that allows the driver to feel a decrease in the assist force.

6. The vehicle steering device according to claim 3, further comprising a steering operation end determination unit that determines whether or not one performance of steering operation has ended,
wherein if the abnormality-time steering operation determination unit determines that the steering operation that satisfies the steering operation criterion condition has been started, the control value reduction unit gradually increases the value of the steering torque relative to the target current value in the assist characteristic during a time from determination that the steering operation has been started until determination that the steering operation has ended.

7. The vehicle steering device according to claim 1, wherein:
the motor control value is a target current value of the electric motor;
the assist characteristic sets a relation between the steering torque and the target current value such that the target current value increases with an increase in the steering torque, and such that the target current value is restricted to be less than or equal to an upper-limit current value; and
the control value reduction unit reduces the motor control value that corresponds to the steering torque by reducing the upper-limit current value.

8. The vehicle steering device according to claim 7, wherein:
the control value computation unit stores a plurality of steps of descending values of assist characteristics that are lowered from one another in the upper-limit current value; and
the control value reduction unit reduces the upper-limit current value by one step each time the abnormality-time steering operation determination unit determines that the steering operation that satisfies the steering operation criterion condition has been started.

9. The vehicle steering device according to claim 8, further comprising a steering operation end determination unit that determines whether or not one performance of steering operation has ended,
wherein if the abnormality-time steering operation determination unit determines that the steering operation that satisfies the steering operation criterion condition has been started, the control value reduction unit gradually decreases the upper-limit current value during a time from determination that the steering operation has been started until determination that the steering operation has ended.

10. The vehicle steering device according to claim 1, wherein the control value reduction unit reduces the motor control value that corresponds to the steering torque by reducing an upper-limit electric power value that sets an upper limit of electric power consumption of the electric motor.

11. The vehicle steering device according to claim 10, wherein:
the control value computation unit stores a plurality of steps of descending values of assist characteristics that are gradually lowered from one another in the upper-limit electric power value of the electric power consumption of the electric motor; and
the control value reduction unit reduces the upper-limit electric power value by one step each time the abnormality-time steering operation determination unit determines that the steering operation that satisfies the steering operation criterion condition has been started.

12. The vehicle steering device according to claim 10, further comprising a steering operation end determination unit that determines whether or not one performance of steering operation has ended,
wherein if the abnormality-time steering operation determination unit determines that the steering operation that satisfies the steering operation criterion condition has been started, the control value reduction unit gradually decreases the upper-limit electric power value during a time from determination that the steering operation has been started until determination that the steering operation has ended.

13. The vehicle steering device according to claim 1, further comprising:
a steering speed detection unit that detects steering speed; and
a reduction amount restriction unit that decreases a reduction amount by which the control value reduction unit reduces the motor control value if the steering speed detected by the steering speed detection unit is greater than a pre-set reference steering speed.

14. The vehicle steering device according to claim 1, further comprising a reduction amount restriction unit that decreases a reduction amount by which the control value reduction unit reduces the motor control value if the steering torque detected by the steering torque detection unit is greater than a pre-set reduction amount restriction criterion torque.

15. The vehicle steering device according to claim 1, wherein:
the electric power source device has a main electric power source that supplies source power to a plurality of electrical loads in the vehicle that include the electric motor, and a subsidiary electric power source which is connected in parallel between the main electric power source and the electric motor, and which stores electric power that the main electric power source outputs, and which assists in supply of source power to the electric motor by using the electric power stored; and
the electric power source abnormality detection unit detects a state in which source power is unable to be supplied from the main electric power source to the electric motor.

16. The vehicle steering device according to claim 15, wherein if the electric power source abnormality detection unit determines that the state in which the source power is unable to be supplied from the main electric power source is detected, supply of the source power to the electric motor is switched from the main electric power source to the subsidiary electric power source.

17. A control method for a vehicle steering device that includes: a steering mechanism that steers a wheel of a vehicle upon steering operation of a steering handle; an electric motor that is supplied with source power from an electric power source device and that generates assist force that assists in the steering operation of the steering handle; a steering torque detection unit that detects steering torque that a driver of the vehicle inputs to the steering handle; a control value computation unit that stores an assist characteristic that sets a motor control value that corresponds to the steering torque, and that computes the motor control value based on the assist characteristic; and a motor control unit that controls driving of the electric motor so that if the motor control value is larger, a larger assist force is generated, based on the motor control value computed by the control value computation unit, the control method comprising:
detecting abnormality of source power supply capability of the electric power source device;
determining whether or not a steering operation that satisfies a pre-set steering operation criterion condition has been started if the abnormality of the source power supply capability of the electric power source device has been detected; and
reducing, with the motor control unit, the motor control value that corresponds to the steering torque by one step, if it is determined that the steering operation that satisfies the steering operation criterion condition has been started,
wherein it is determined that the steering operation that satisfies the steering operation criterion condition has been started, if the steering torque detected by the steering torque detection unit is greater than a pre-set reference value.

18. The control method according to claim 17, wherein:
it is repeatedly determined whether or not the steering operation that satisfies the steering operation criterion condition has been started; and
the motor control value that corresponds to the steering torque is reduced each time it is determined that the steering operation that satisfies the steering operation criterion condition is started.

19. The control method according to claim 18, wherein degree of reduction of the motor control value by the control value reduction unit increases with an increase in number of times of it being determined that the steering operation that satisfies the steering operation criterion condition has been started.

* * * * *